(12) United States Patent
Mizumoto et al.

(10) Patent No.: US 12,574,114 B2
(45) Date of Patent: Mar. 10, 2026

(54) COMMUNICATION APPARATUS, COMMUNICATION SYSTEM, COMMUNICATION CONTROL METHOD, AND RECORDING MEDIUM

(71) Applicant: NEC Corporation, Tokyo (JP)

(72) Inventors: Hisashi Mizumoto, Tokyo (JP); Hiroshi Imai, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 352 days.

(21) Appl. No.: 18/480,816

(22) Filed: Oct. 4, 2023

(65) Prior Publication Data

US 2024/0129031 A1    Apr. 18, 2024

(30) Foreign Application Priority Data

Oct. 13, 2022    (JP) ................................. 2022-164681

(51) Int. Cl.
H04B 10/11          (2013.01)
(52) U.S. Cl.
CPC .................................... H04B 10/11 (2013.01)
(58) Field of Classification Search
None
See application file for complete search history.

(56) References Cited

U.S. PATENT DOCUMENTS

2020/0366369 A1* 11/2020 Kyosuna .............. H04B 10/112

FOREIGN PATENT DOCUMENTS

WO        2019/026175 A1    2/2019

* cited by examiner

*Primary Examiner* — David W Lambert
(74) *Attorney, Agent, or Firm* — Sughrue Mion, PLLC

(57)                    ABSTRACT

A communication apparatus including a transmitter that transmits modulated light modulated by a modulation part of a spatial light modulator as a first spatial light signal, a receiver that receives a second spatial light signal transmitted from a communication target, a detector that detects a physical quantity related to oscillation of the own apparatus, and a communication control unit that acquires the physical quantity detected by the detector and information on oscillation of the communication target included in the second spatial light signal, analyzes a state of the oscillation of the communication target using the information on the oscillation of the communication target and the physical quantity, and sets a transmission condition of the first spatial light signal in the transmitter according to the analyzed state of the oscillation of the communication target.

10 Claims, 28 Drawing Sheets

Fig.22

| | | $T_1$ | $T_2$ | $T_3$ | $T_4$ | $T_5$ |
|---|---|---|---|---|---|---|
| MODULATION REGION | $R_A$ | $I_A$ | $I_D$ | $I_D$ | $I_D$ | $I_D$ |
| | $R_B$ | $I_B$ | $I_B$ | $I_E$ | $I_E$ | $I_E$ |
| | $R_C$ | $I_C$ | $I_C$ | $I_C$ | $I_C$ | $I_C$ |
| LIGHT EMITTER | $L_A$ | ON | OFF | OFF | ON | OFF |
| | $L_B$ | OFF | ON | OFF | OFF | ON |
| | $L_C$ | OFF | OFF | ON | OFF | OFF |

Fig.24

| | | $T_1$ | $T_2$ | $T_3$ | $T_4$ | $T_5$ |
|---|---|---|---|---|---|---|
| MODULATION REGION | $R_A$ | $I_B$ | $I_B$ | $I_B$ | $I_B$ | $I_B$ |
| | $R_B$ | $I_C$ | $I_C$ | $I_A$ | $I_A$ | $I_C$ |
| LIGHT EMITTER | $L_A$ | ON | OFF | ON | OFF | ON |
| | $L_B$ | OFF | ON | OFF | ON | OFF |
| DISPLAY | | $F_B$ | $F_C$ | $F_B$ | $F_A$ | $F_B$ |

COMMUNICATION APPARATUS, COMMUNICATION SYSTEM, COMMUNICATION CONTROL METHOD, AND RECORDING MEDIUM

This application is based upon and claims the benefit of priority from Japanese Patent Application No. 2022-164681, filed on Oct. 13, 2022, the disclosure of which is incorporated herein in its entirety by reference.

TECHNICAL FIELD

The present disclosure relates to a communication apparatus and the like used for optical space communication.

BACKGROUND ART

Optical space communication is performed using optical signals (hereinafter, spatial light signals) propagating in a space without passing through a medium such as an optical fiber. If the spatial light signals can be transmitted in a plurality of directions around the communication apparatus, it is possible to construct a communication network using the spatial light signals. In order to perform optical space communication with a communication apparatus in an arbitrary direction, it is necessary to align transmission and reception directions of spatial optical signals to and from the communication target.

Patent Literature 1 (WO 2019/026175 A) discloses a reception apparatus that receives signal light emitted from a transmitter. The reception apparatus in Patent Literature 1 includes a control unit, a phase modulation-type spatial light modulation element, and a detector. The control unit combines a virtual lens image with a phase image generated based on position information indicating the position of the transmitter to generate a composite image. The phase modulation-type spatial light modulation element receives the supply of the composite image, and diffracts and collects the signal light. The detector receives the signal light diffracted and condensed.

The reception apparatus in Patent Literature 1 generates a phase image based on position information of each transmitter acquired from a global positioning system (GPS) or a navigation system. Therefore, according to the method in Patent Literature 1, communication can be continued in accordance with changes in the relative positions and postures of the transmitter and the reception apparatus. Communication apparatuses arranged in spaces on utility poles or electric lights may oscillate due to various factors. The positional relationship among the plurality of communication apparatuses varies complicatedly in accordance with the oscillations of the communication apparatuses. These oscillations cannot be accurately grasped only from the position information of the communication apparatuses. Therefore, the method in Patent Literature 1 does not make it possible to resolve communication interruption due to oscillations of individual communication apparatuses that cannot be grasped only from the position information.

An object of the present disclosure is to provide a communication apparatus and the like capable of continuing stable communication even in the event of oscillations of the own apparatus and the communication target.

SUMMARY

A communication apparatus according to an aspect of the present disclosure includes a transmitter that transmits modulated light modulated by a modulation part of a spatial light modulator as a first spatial light signal, a reception apparatus that receives a second spatial light signal transmitted from a communication target, a detector that detects a physical quantity related to oscillation of the own apparatus, and a communication control unit that acquires the physical quantity detected by the detector and information on oscillation of the communication target included in the second spatial light signal, analyzes a state of the oscillation of the communication target using the information on the oscillation of the communication target and the physical quantity, and sets a transmission condition of the first spatial light signal in the transmitter according to the analyzed state of the oscillation of the communication target.

A communication control method according to an aspect of the present disclosure is a communication control method of a communication apparatus including a transmitter that transmits modulated light modulated by a modulation part of a spatial light modulator as a first spatial light signal, a reception apparatus that receives a second spatial light signal transmitted from a communication target, and a detector that detects a physical quantity related to oscillation of the own apparatus, the communication control method including acquiring the physical quantity detected by the detector and information on oscillation of the communication target included in the second spatial light signal, analyzing a state of the oscillation of the communication target using the information on the oscillation of the communication target and the physical quantity, and setting a transmission condition of the first spatial light signal in the transmitter according to the analyzed state of the oscillation of the communication target.

A program according to an aspect of the present disclosure is a program for controlling a communication apparatus including a transmitter configured to transmit modulated light modulated by a modulation part of a spatial light modulator as a first spatial light signal, a receiver configured to receive a second spatial light signal transmitted from a communication target, and a detector configured to detect a physical quantity related to oscillation of the own apparatus, and the program causes a computer to execute acquiring the physical quantity detected by the detector and information on oscillation of the communication target included in the second spatial light signal, analyzing a state of the communication target using the information on the oscillation of the communication target and the physical quantity, and setting a transmission condition of the first spatial light signal in the transmitter according to the analyzed state of the oscillation of the communication target.

BRIEF DESCRIPTION OF THE DRAWINGS

Exemplary features and advantages of the present invention will become apparent from the following detailed description when taken with the accompanying drawings in which:

FIG. 22 is a table for describing a transmitter control example 1 by the communication apparatus according to the first example embodiment:

FIG. 24 is a table for describing a transmitter control example 2 by the communication apparatus according to the first example embodiment:

EXAMPLE EMBODIMENT

Figure 1:
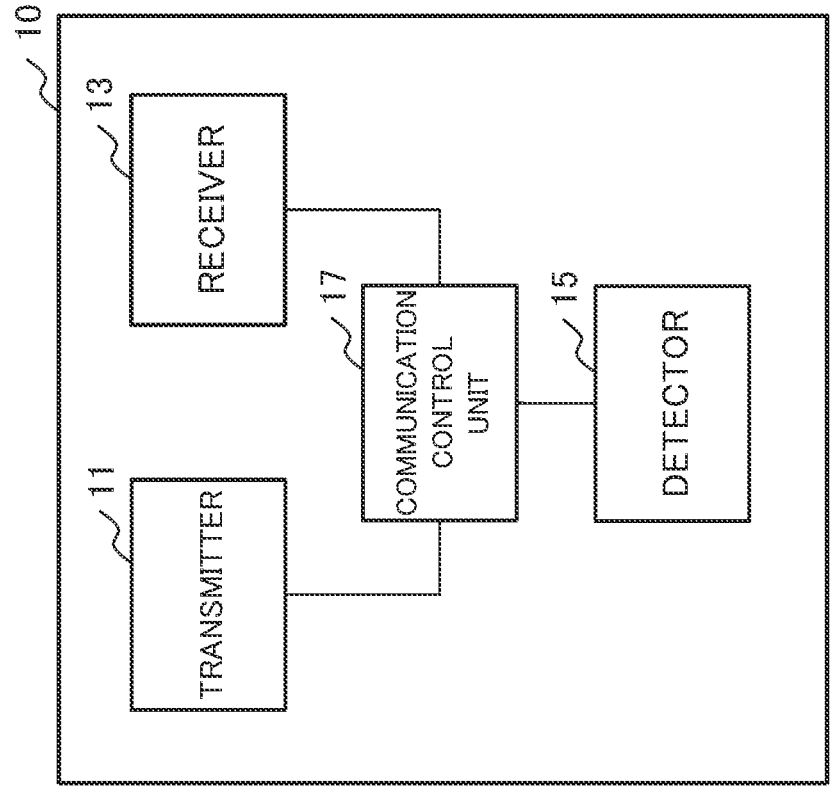
FIG. 1 is a block diagram illustrating an example of a configuration of a communication apparatus according to a first example embodiment.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

In all the drawings used for description of the following example embodiments, the directions of the arrows in the drawings are merely examples, and do not limit the directions of light and signals. Lines indicating trajectories of light in the drawings are conceptual, and do not accurately indicate actual traveling directions or states of light. For example, in the drawings, changes in the traveling direction or state of light due to refraction, reflection, diffusion, or the like at an interface between air and a substance may be omitted, or a light flux may be expressed by one line.

First Example Embodiment

First, a communication apparatus according to the present example embodiment will be described with reference to the drawings. The communication apparatus of the present example embodiment is used for optical space communication in which optical signals propagating in a space (hereinafter, also referred to as spatial light signals) are transmitted and received without using a medium such as an optical fiber. The communication apparatus of the present example embodiment may be used for applications other than optical space communication as long as the communication apparatus is used for transmitting and receiving light propagating in a space. In the present example embodiment, the spatial light signal is regarded as parallel light since it arrives from a sufficiently distant position. The drawings used in the description of the present example embodiment are conceptual and do not accurately depict an actual structure.

(Configuration)

FIG. 1 is a conceptual diagram illustrating an example of a configuration of a communication apparatus 10 according to the present example embodiment. The communication apparatus 10 includes a transmitter 11, a receiver 13, a detector 15, and a communication control unit 17. The communication apparatus 10 transmits and receives spatial optical signals to and from another communication apparatus 10 (communication target). Hereinafter, configurations of the transmitter 11, the receiver 13, the detector 15, and the communication control unit 17 of the communication apparatus 10 will be individually described. In the following description, the spatial light signal transmitted by the communication apparatus 10 toward the communication target will be called first spatial light signal. The spatial light signal transmitted from the communication target toward the communication apparatus 10 will be called second spatial light signal.

[Transmitter]

Figure 2:
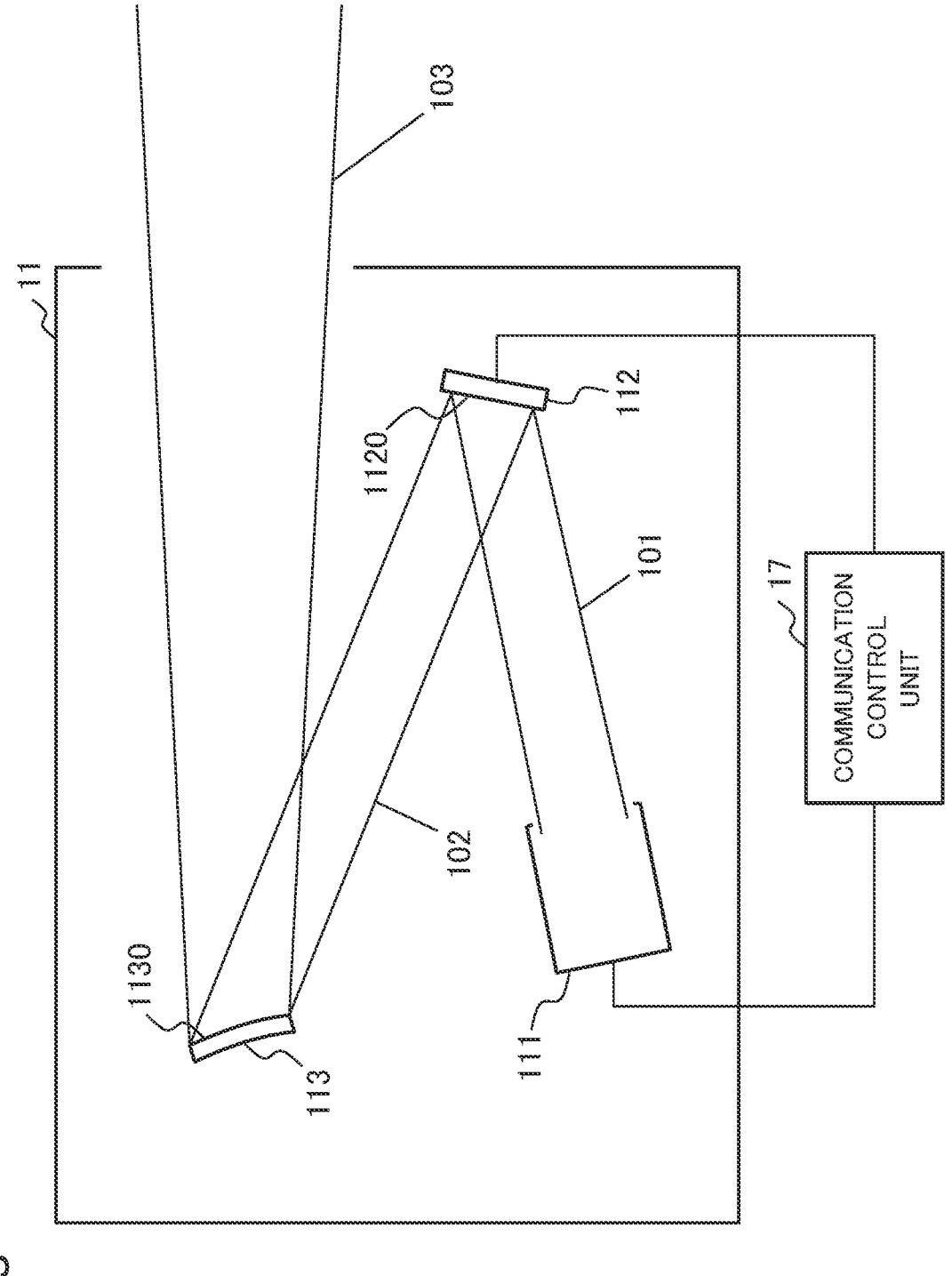
FIG. 2 is a block diagram illustrating an example of a configuration of a transmitter included in the communication apparatus according to the first example embodiment.

FIG. 2 is a conceptual diagram illustrating an example of a configuration of the transmitter 11. The transmitter 11 has a light source 111, a spatial light modulator 112, and a curved mirror 113. The light source 111, the spatial light modulator 112, and the curved mirror 113 are arranged in a housing of the transmitter 11. The light source 111 and the spatial light modulator 112 are connected to the communication control unit 17.

The light source 111 emits light (illumination light 101) used for communication under the control of the communication control unit 17. The light source 111 emits the illumination light 101 toward the spatial light modulator 112. The illumination light 101 is modulated according to the contents of communication. For example, the illumination light 101 is modulated at a different frequency for each communication target.

Figure 3:
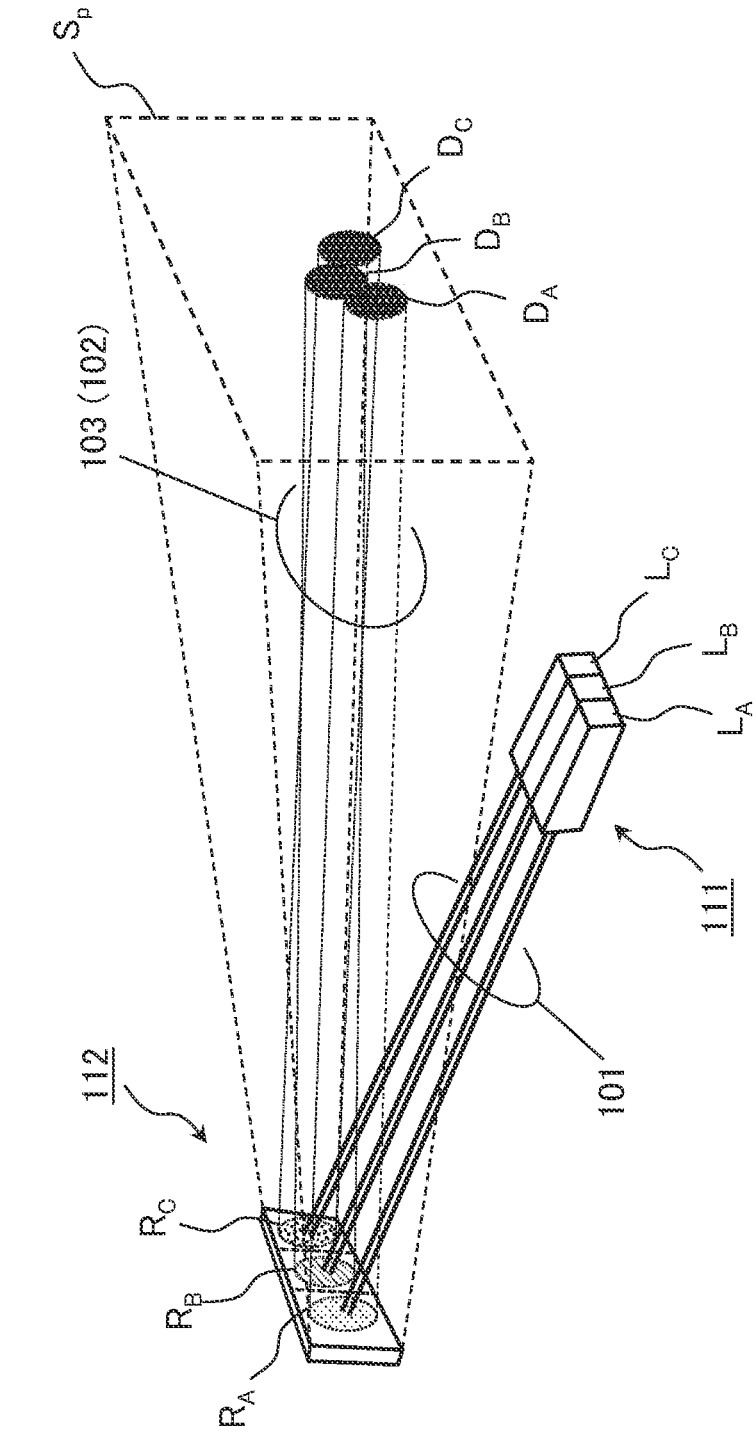
FIG. 3 is a conceptual diagram for describing an example of irradiation of dots displayed by a spatial light signal transmitted from the transmitter included in the communication apparatus according to the first example embodiment.

FIG. 3 is a conceptual diagram illustrating an example of an optical path in the internal configuration of the transmitter 11. FIG. 3 does not illustrate the curved mirror 113. In the example of FIG. 3, the light source 111 includes three light emitters ($L_A$, $L_B$, and $L_C$). The number of light emitters included in the light source 111 is not limited to three. The number of light emitters included in the light source 111 may be four or more or two or less. Each light emitter emits light modulated according to a pattern of a signal to be transmitted to the communication target. For example, the light emitted from the light emitter is converted into illumination light via an optical system. The illumination light emitted from the light source 111 travels toward the spatial light modulator 112.

Each light emitter included in the light source 111 emits laser light in a predetermined wavelength band under the control of the communication control unit 17. The wavelength of the laser light emitted from the light emitter is not particularly limited, and may be selected according to the use purpose. For example, the light emitter emits laser light in a visible or infrared wavelength band. For example, in the case of near infrared rays of 800 to 900 nanometers (nm), since the laser class can be increased, the sensitivity can be improved by about one digit as compared with other wavelength bands. For example, a high-power laser light source can be used for infrared rays in a wavelength band of 1.55 micrometers ($\mu$m). As the laser light source in the wavelength band of 1.55 $\mu$m, an aluminum gallium arsenide phosphorus (AlGaAsP)-based laser light source, an indium gallium arsenide (InGaAs)-based laser light source, or the like can be used. The longer the wavelength of the laser light is, the larger the diffraction angle can be made and the higher the energy can be set.

The spatial light modulator 112 is a phase modulation-type modulator. The spatial light modulator 112 includes a modulation part 1120. A modulation region is set in the modulation part 1120. In the modulation region of the modulation part 1120, a pattern (also called phase image) corresponding to the image displayed by projection light is set under the control of the communication control unit 17. The modulation part 1120 is irradiated with the illumination light 101 emitted from the light source 111. The illumination light 101 is modulated according to the pattern (phase image) set in the modulation part 1120. Modulated light 102 modulated by the modulation part 1120 travels toward the curved mirror 113.

For example, the spatial light modulator 112 is implemented by a spatial light modulator using ferroelectric liquid crystal, homogeneous liquid crystal, vertical alignment liquid crystal, or the like. For example, the spatial light modulator 112 can be implemented by liquid crystal on silicon (LCOS). Furthermore, the spatial light modulator 112 may be implemented by a micro electro mechanical system (MEMS). In the phase modulation-type spatial light modulator 112, the energy can be concentrated on the portion of the image by operating to sequentially switch among the portions that project the projection light. Therefore, in the case of using the phase modulation-type spatial light modulator 112, if the output of the light source 111 is the same, the image can be displayed bright in comparison with other methods.

The modulation region of the modulation part 1120 is divided into a plurality of regions (also referred to as tiling). For example, the modulation region is divided into rectangular regions (also referred to as tiles) having a desired aspect ratio. A phase image is assigned to each of the plurality of tiles. Each of the plurality of tiles includes a plurality of pixels. A phase image corresponding to a projected image is set to each of the plurality of tiles. The phase images set to the plurality of tiles may be the same or different. For example, a phase image generated in advance is set to each of the plurality of tiles. When the modulation part 1120 is irradiated with the illumination light in a state where the phase images are set to the plurality of tiles, the modulated light 102 that forms an image corresponding to the phase image of each tile is emitted. As the number of tiles set in the modulation part 1120 increases, a clear image can be displayed. If the number of tiles set to the modulation part 1120 is too large, the number of pixels of each tile decreases, and the resolution deteriorates. Therefore, the size and number of tiles set in the modulation region of the modulation part 1120 are set according to the use purpose.

The curved mirror 113 is arranged at a subsequent stage of the spatial light modulator 112. The curved mirror 113 is a reflecting mirror having a curved reflecting surface 1130. The reflecting surface 1130 of the curved mirror 113 has a curvature corresponding to a projection angle of projection light. For example, the reflecting surface 1130 of the curved mirror 113 has a shape of a side surface of a cylinder. For example, the reflecting surface 1130 of the curved mirror 113 may be a free-form surface or a spherical surface. For example, the reflecting surface 1130 of the curved mirror 113 may have a shape in which a plurality of curved surfaces is combined instead of a single curved surface. For example, the reflecting surface 1130 of the curved mirror 113 may have a shape in which a curved surface and a flat surface are combined.

The curved mirror 113 is arranged with the reflecting surface 1130 facing the modulation part 1120 of the spatial light modulator 112. The curved mirror 113 is arranged on an optical path of the modulated light 102. The reflecting surface 1130 of the curved mirror 113 is irradiated with the modulated light 102. The light (projection light 103) reflected by the reflecting surface 1130 is projected as a spatial light signal. The projection light 103 is enlarged according to the curvature of the irradiation range of the modulated light 102 on the reflecting surface 1130 of the curved mirror 113. The transmitter 11 may have a projection optical system including a Fourier transform lens, a projection lens, and the like, instead of the curved mirror 113.

For example, a shield (not illustrated) may be arranged at a stage subsequent to the spatial light modulator 112. The shield is a frame that shuts off unnecessary light components included in the modulated light 102 and defines the outer edge of a display area of the projection light 103. For example, the shield is an aperture. Such an aperture has a slit-shaped opening formed in a portion through which light (desired light) for forming a desired image passes. The desired light is first-order diffracted light. The shield passes the desired light and shuts off unnecessary light components. For example, the shield shuts off a ghost image including 0th-order light included in the modulated light 102, unnecessary first-order light appearing at a point symmetric position with respect to the desired light around the 0th-order light, and second- and higher-order light. Details of the shield will not be described.

In the example of FIG. 3, three modulation regions (R_A, R_B, and R_C) are set in the modulation part 1120. FIG. 3 illustrates the irradiation ranges of the illumination light with which the modulation part 1120 is irradiated, by broken-line circles. In each of the modulation region R_A, the modulation region R_B, and the modulation region R_C, the modulation part 1120 is irradiated with the illumination light 101 derived from light emitted from each of a light emitter L_A, a light emitter L_B, and a light emitter L_C. The illumination light 101 emitted to each of the modulation region R_A, the modulation region R_B, and the modulation region R_C is modulated according to the phase images set in these regions. The modulated light 102 modulated in each of the modulation region R_A, the modulation region R_B, and the modulation region R_C is reflected by the reflecting surface 1130 of the curved mirror 113 and projected as the projection light 103. The projection light 103 derived from the modulated light 102 modulated in the modulation region R_A is displayed as a dot D_A on a projection plane S_P at the position of the communication target. The projection light 103 derived from the modulated light 102 modulated in the modulation region R_B is displayed as a dot D_B on the projection plane S_P at the position of the communication target. The projection light 103 derived from the modulated light 102 modulated in the modulation region R_C is displayed as a dot D_C on the projection plane S_P at the position of the communication target.

Figure 4:
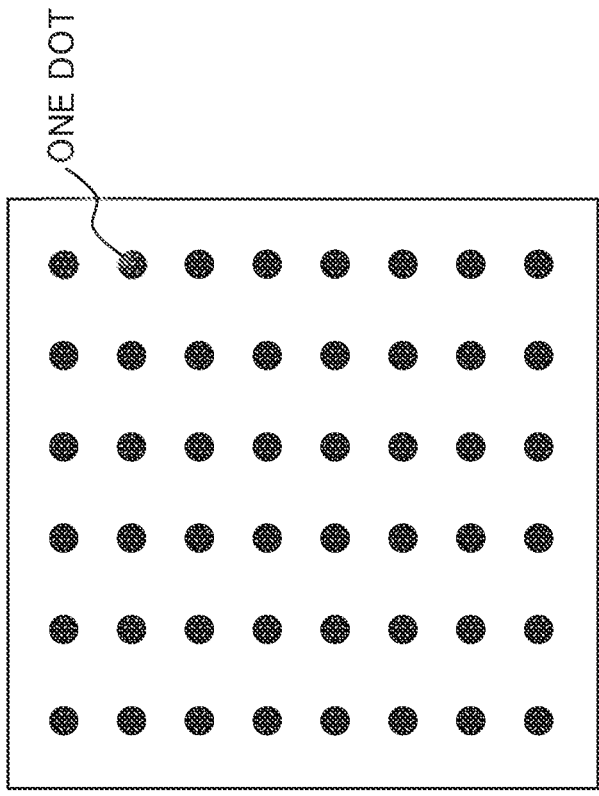
FIG. 4 is a conceptual diagram for describing an example of dots displayed by a spatial light signal transmitted from the transmitter included in the communication apparatus according to the first example embodiment.

FIG. 4 is a conceptual diagram illustrating a display example of an image formed by the projection light 103 projected using the phase modulation-type spatial light modulator 112. FIG. 4 is a display example of an image at the position of the communication target. Compared with other modulation schemes, the phase modulation-type spatial light modulator 112 is effective in projecting light with high efficiency, but is low in resolution. Since the pixels of the projection light 103 projected using the phase modulation-type spatial light modulator 112 are concentrated in dots, gaps larger than the dots are formed between the dots.

According to a general method, it is difficult to form an image in which dots are connected, by using the phase modulation-type spatial light modulator 112. If the communication target is located between the dots, the spatial light signal is not received by the communication target. The transmitter 11 of the present example embodiment has the light source 111 including three light emitters. Performing phase control of the spatial light modulator 112 makes it possible to shift the image formed by the dots of the projection light 103 between the dots illustrated in FIG. 4. According to the method of the present example embodiment, dots can be displayed on the projection plane S_P in such a way as to fill the gaps between the dots as illustrated in FIG. 3. Therefore, even if the communication target is located in the gap between the dots, the transmitter 11 of the present example embodiment can emit the spatial light signal to the communication target. The switching of the phase image set in the modulation part 1120 of the spatial light modulator 112 depends on the operation speed of liquid crystal. In a wavelength band of 1550 nm (nanometers) used in optical space communication, the response of liquid crystal is about 150 to 200 milliseconds. Even in the wavelength band of 800 to 1000 nm, the response of liquid crystal is about 50 ms to 100 ms. That is, in the wavelength band used in optical space communication, the switching of the phase image set in the modulation part 1120 of the spatial light modulator 112 is limited in rate by the response of liquid crystal. Therefore, it is difficult to move the dots following the oscillation only by replacing the phase image set in the modulation part 1120. In the present example embodiment, the modulation part 1120 is divided into a plurality of modulation regions. In the examples of FIGS. 22 to 25 described later, the active modulation region is sequentially switched to replace the phase image of the inactive modulation region. In this way, since the phase image of the inactive modulation region can be replaced before the response of liquid crystal is completed, the dots can be moved following the oscillation.

[Receiver]

Figure 5:
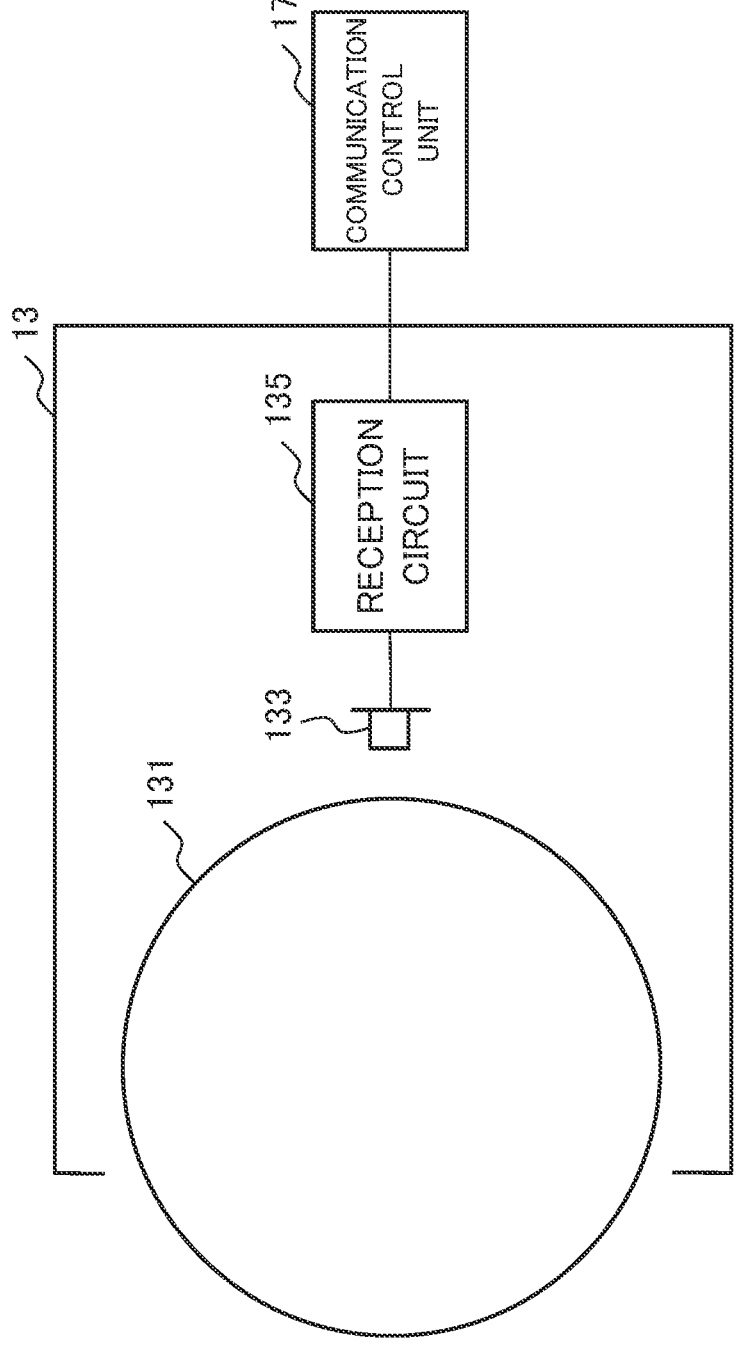
FIG. 5 is a block diagram illustrating an example of a configuration of a receiver included in the communication apparatus according to the first example embodiment.

A configuration of the receiver 13 will be described with reference to FIG. 5. FIG. 5 is a conceptual diagram for describing an example of a configuration of the receiver 13. The receiver 13 includes a ball lens 131, a light receiving element 133, and a reception circuit 135. FIG. 5 is a side view of the internal configuration of the receiver 13 as viewed from the lateral direction. The position of the reception circuit 135 is not particularly limited. The reception circuit 135 may be arranged inside the receiver 13 or may be arranged outside the receiver 13. The function of the reception circuit 135 may be included in the communication control unit 17.

The ball lens 131 is a spherical lens. The ball lens 131 is an optical element that collects a spatial light signal transmitted from a communication target. The ball lens 131 has a spherical shape when viewed from an arbitrary angle. A part of the ball lens 131 protrudes from an opening in the housing of the receiver 13. The ball lens 131 collects the incident spatial light signal. The spatial light signal incident on the ball lens 131 protruding from the opening is collected. As long as the spatial light signal can be collected, a part of the ball lens 131 may not protrude from the opening.

The light (optical signal) derived from the spatial light signal collected by the ball lens 131 is condensed toward a condensing region of the ball lens 131. Since the ball lens 131 has a spherical shape, the ball lens 131 collects spatial light signals arriving from arbitrary directions. That is, the ball lens 131 exhibits similar light collecting performance for spatial light signals arriving from arbitrary directions. The light incident on the ball lens 131 is refracted when entering the inside of the ball lens 131. The light traveling inside the ball lens 131 is refracted again when being emitted to the outside of the ball lens 131. Most of the light emitted from the ball lens 131 is condensed in the condensing region.

For example, the ball lens 131 can be made of a material such as glass, crystal, or resin. In the case of receiving a spatial light signal in the visible region, the ball lens 131 can be achieved by a material such as glass, crystal, or resin that transmits/refracts light in the visible region. For example, the ball lens 131 can be achieved by optical glass such as crown glass or flint glass. For example, the ball lens 131 can be achieved by a crown glass such as Boron Kron (BK). For example, the ball lens 131 can be achieved by flint glass such as Lanthanum Schwerflint (LaSF). For example, quartz glass can be applied to the ball lens 131. For example, crystal such as sapphire can be applied to the ball lens 131. For example, a transparent resin such as acrylic can be applied to the ball lens 131.

If the spatial light signal is light in a near-infrared region (hereinafter, near-infrared rays), a material that transmits near-infrared rays is used for the ball lens 131. For example, in the case of receiving a spatial light signal in a near-infrared region of about 1.5 micrometers (μm), a material such as silicon in addition to glass, crystal, resin, and the like can be applied to the ball lens 131. If the spatial light signal is light in an infrared region (hereinafter, infrared rays), a material that transmits infrared rays is used for the ball lens 131. For example, if the spatial light signal is an infrared ray, silicon, germanium, or a chalcogenide material can be applied to the ball lens 131. The material of the ball lens 131 is not limited as long as the ball lens 131 can transmit/refract light in the wavelength region of the spatial light signal. The material of the ball lens 131 may be selected as appropriate according to the required refractive index and use purpose.

The ball lens 131 may be replaced with another concentrator as long as the spatial light signal can be condensed toward the region where the light receiving element 133 is arranged. For example, instead of the ball lens 131, a convex lens may be arranged to condense the incident spatial light signal toward the light receiving portion of the light receiving element 133. For example, instead of the ball lens 131, a light beam control element may be arranged to guide the incident spatial light signal toward the light receiving unit of the light receiving element 133. For example, the ball lens 131 may be replaced with a configuration in which a lens and a light beam control element are combined. For example, a mechanism that guides the optical signal condensed by the ball lens 131 toward the light receiving unit of the light receiving element 133 may be added.

The light receiving element 133 is arranged at a stage subsequent to the ball lens 131. The light receiving element 133 is arranged in the condensing region of the ball lens 131. The light receiving element 133 includes a light receiving unit that receives the optical signal collected by the ball lens 131. The light signal collected by the ball lens 131 is received by the light receiving unit of the light receiving element 133. The light receiving element 133 converts the received optical signal into an electric signal (hereinafter, signal). The light receiving element 133 outputs the converted signal to the reception circuit 135. FIG. 5 illustrates an example in which the light receiving element 133 is a single element. For example, a plurality of light receiving elements 133 may be arranged in the condensing region of the ball lens 131. For example, a light receiving element array in which a plurality of light receiving elements 133 is arrayed may be arranged in the condensing region of the ball lens 131.

The light receiving element 133 receives light in a wavelength region of a spatial light signal to be received. For example, the light receiving element 133 is sensitive to light in the visible region. For example, the light receiving element 133 is sensitive to light in the infrared region. The light receiving element 133 is sensitive to light in a wavelength band of 1.5 μm (micrometer), for example. The wavelength band of the light received by the light receiving element 133 is not limited to the 1.5-μm band. The wavelength band of the light received by the light receiving element 133 can be arbitrarily set in accordance with the wavelength of the spatial light signal to be received. The wavelength band of the light received by the light receiving element 133 may be set to a 0.8-μm band, a 1.55-μm band, or a 2.2-μm band, for example. The wavelength band of the light received by the light receiving element 133 may be a 0.8- to 1-μm band, for example. As the wavelength band of light is shorter, the absorption of light by moisture in the atmosphere is small, which is advantageous for optical space communication during rainfall. If the light receiving element 133 is saturated with intense sunlight, the light receiving element 133 cannot read the optical signal derived from the spatial light signal. Therefore, a color filter that selectively lets pass the light in the wavelength band of optical space communication may be placed at the stage preceding the light receiving element 133.

For example, the light receiving element 133 can be implemented by an element such as a photodiode or a phototransistor. For example, the light receiving element 133 is implemented by an avalanche photodiode. The light receiving element 133 implemented by the avalanche photodiode can support high-speed communication. The light receiving element 133 may be implemented by an element other than a photodiode, a phototransistor, or an avalanche photodiode as long as it can convert an optical signal into an electrical signal. In order to improve the communication speed, the light receiving unit of the light receiving element 133 is preferably as small as possible. For example, the light receiving unit of the light receiving element 133 has a square light receiving surface having a side of about 5 mm (millimeters). For example, the light receiving unit of the light receiving element 133 has a light receiving area having a diameter of about 0.1 to 0.3 mm (millimeter). The size and shape of the light receiving unit of the light receiving element 133 may be selected according to the wavelength band, the communication speed, and the like of the spatial light signal.

For example, a polarizing filter (not illustrated) may be arranged at the stage preceding the light receiving element 133. The polarizing filter is arranged in association with the light receiving unit of the light receiving element 133. For example, the polarizing filter is arranged to overlap the light receiving unit of the light receiving element 133. For example, the polarizing filter may be selected according to the polarization state of the spatial light signal to be received. For example, if the spatial light signal to be received is linearly polarized light, the polarizing filter includes a half-wavelength plate. For example, if the spatial light signal to be received is circularly polarized light, the polarizing filter includes a quarter wavelength plate. The polarization state of the optical signal having passed through the polarizing filter is converted according to the polarization characteristic of the polarizing filter.

The reception circuit 135 acquires a signal output from the light receiving element 133. The reception circuit 135 amplifies the signal from the light receiving element 133. The reception circuit 135 decodes the amplified signal. The signal decoded by the reception circuit 135 is used for an arbitrary purpose. The use of the signal decoded by the reception circuit 135 is not particularly limited.

[Detector]

Figure 6:
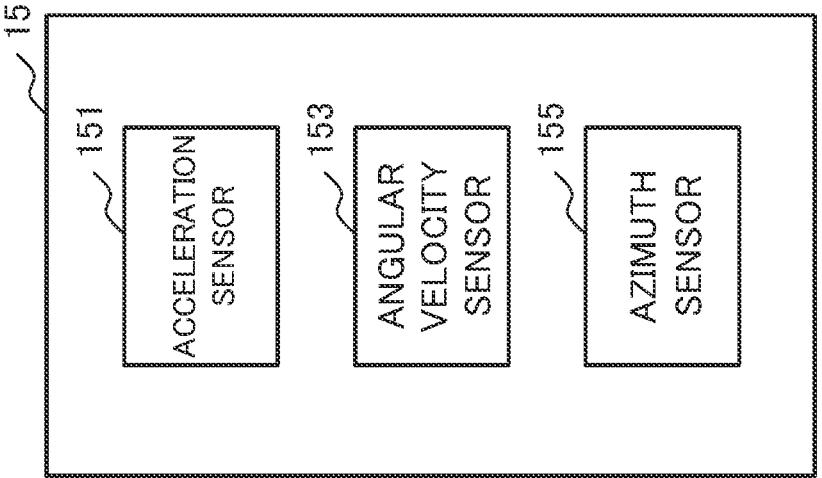
FIG. 6 is a block diagram illustrating an example of a configuration of a detector included in the communication apparatus according to the first example embodiment.

FIG. 6 is a block diagram illustrating an example of a configuration of the detector 15. The detector 15 includes an acceleration sensor 151, an angular velocity sensor 153, and an azimuth sensor 155. The detector 15 measures physical quantities in accordance with the oscillation of the acceleration sensor 151, the angular velocity sensor 153, and the azimuth sensor 155. The physical quantities measured by the acceleration sensor 151, the angular velocity sensor 153, and the azimuth sensor 155 are associated with the times when the physical quantities were measured. Data including the physical quantities measured by the acceleration sensor 151, the angular velocity sensor 153, and the azimuth sensor 155 and the times when the physical quantities were measured constitutes measurement values.

The acceleration sensor 151 is a sensor that measures acceleration in three axial directions (also called spatial acceleration). The acceleration sensor 151 measures acceleration (also called spatial acceleration) as a physical quantity related to the oscillation of the communication apparatus 10. The acceleration sensor 151 outputs the measured acceleration to the communication control unit 17. The method of measurement by the sensor used as the acceleration sensor 151 is not limited as long as the sensor can measure acceleration. For example, a sensor of a frequency changing type, a piezoelectric type, a piezo-resistive type, a capacitance type, or the like can be used as the acceleration sensor 151.

The angular velocity sensor 153 is a sensor that measures an angular velocity about three axes (also called spatial angular velocity). The angular velocity sensor 153 measures an angular velocity (also called spatial angular velocity) as a physical quantity related to the oscillation of the communication apparatus 10. The angular velocity sensor 153 outputs the measured angular velocity to the communication control unit 17. The method of measurement by the sensor used as the angular velocity sensor 153 is not limited as long as the sensor can measure an angular velocity. For example, a gyro sensor of a vibration type, a capacitance type, or the like can be used as the angular velocity sensor 153.

The azimuth sensor 155 is a sensor that measures an angle about three axes (also called space angle). The azimuth sensor 155 measures an angle (also called spatial angle) as a physical quantity related to the oscillation of the communication apparatus 10. The azimuth sensor 155 outputs the measured angle to the communication control unit 17. The method of measurement by the sensor used as the azimuth sensor 155 is not limited as long as the sensor can measure an angle. For example, as the azimuth sensor 155, a geomagnetic sensor such as a Hall sensor, a magneto resistance (MR) sensor, or a magneto impedance (MI) sensor can be used.

For example, if the angle can be calculated using the acceleration measured by the acceleration sensor 151 or the angular velocity measured by the angular velocity sensor 153, the azimuth sensor 155 may be omitted. In this case, the detector 15 may be implemented by an inertial measurement device that measures acceleration and angular velocity. An example of the inertial measurement device is an inertial measurement unit (IMU). The IMU includes an acceleration sensor 151 that measures acceleration in the three axial directions and an angular velocity sensor 153 that measures an angular velocity around the three axes. The detector 15 may be implemented by an inertial measurement device such as a vertical gyro (VG) or an attitude heading (AHRS). The detector 15 may be implemented by a global positioning system/inertial navigation system (GPS/INS).

For example, the detector 15 may have a function of measuring the position of the communication apparatus 10, using satellite signals that are transmitted from a plurality of artificial satellites constituting a global navigation satellite system (GNSS). For example, the detector 15 measures the position of the communication apparatus 10 using a satellite signal transmitted from an artificial satellite. Such a satellite signal is transmitted from an artificial satellite constituting a global satellite system such as a global positioning system (GPS). Examples of the global navigation satellite system include Galileo, Global Navigation Satellite System (GLONASS), and BeiDou satellite navigation system. For example, the detector 15 may use a satellite signal transmitted from an artificial satellite constituting a regional satellite system. Examples of the regional satellite system include a quasi-zenith satellite system and an Indian regional navigation satellite system. In the case of measuring the position information using a satellite signal, the detector 15 outputs the measured position information to the communication control unit 17.

[Communication Control Unit]

Figure 7:
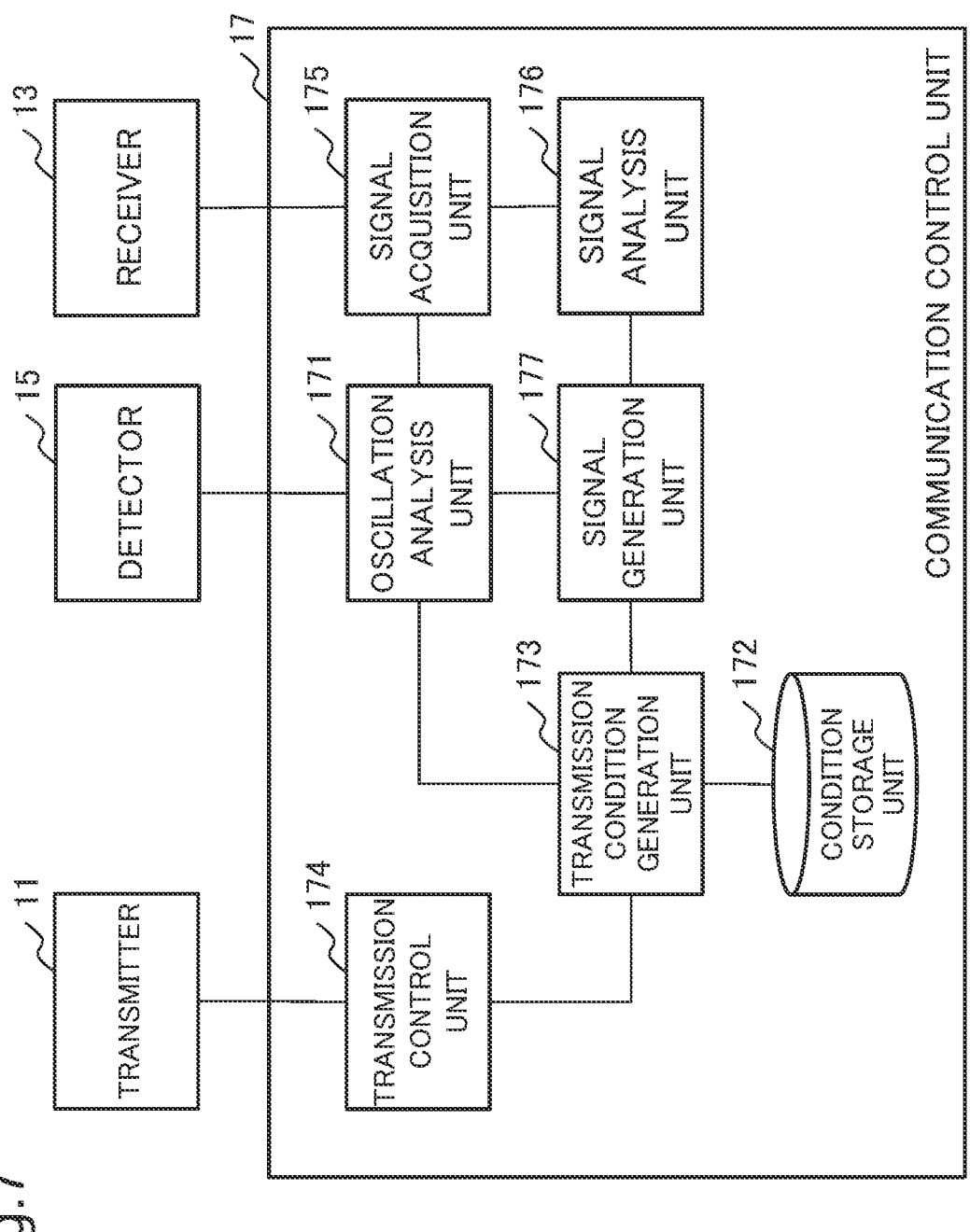
FIG. 7 is a block diagram illustrating an example of a configuration of a communication control unit included in the communication apparatus according to the first example embodiment.

FIG. 7 is a block diagram for describing an example of a configuration of the communication control unit 17. The communication control unit 17 includes an oscillation analysis unit 171, a condition storage unit 172, a transmission condition generation unit 173, a transmission control unit 174, a signal acquisition unit 175, a signal analysis unit 176, and a signal generation unit 177. For example, the communication control unit 17 is implemented by a microcomputer including a processor and a memory. For example, the communication control unit 17 may be implemented in the transmitter 11 or the receiver 13. For example, the communication control unit 17 may be implemented in a server or a cloud connected to the transmitter 11 or the receiver 13 via a network. FIG. 7 illustrates an example of the configuration of the communication control unit 17, and does not limit the configuration of the communication control unit 17.

The oscillation analysis unit 171 acquires a measurement value related to the oscillation of the own apparatus (communication apparatus 10) from the detector 15. The oscillation analysis unit 171 analyzes the status of the oscillation of the own apparatus using the acquired measurement value. The oscillation analysis unit 171 generates tracking data according to the analysis result. The tracking data is data on the relative position of the communication target to the own apparatus according to the oscillation of the own apparatus. Details of the tracking data will be described later. The oscillation analysis unit 171 adds a measurement value related to the oscillation of the own apparatus to the tracking data. The measurement value includes the time when the measurement value was measured. The oscillation analysis unit 171 outputs the generated tracking data to the transmission condition generation unit 173.

The oscillation analysis unit 171 acquires a measurement value related to the oscillation of the communication target from the signal acquisition unit 175. In this case, the oscillation analysis unit 171 generates tracking data by using the measurement value related to the oscillation of the own apparatus and the measurement value related to the oscillation of the communication target. The tracking data generated in this manner corresponds to data that indicates a relative positional relationship between the own apparatus and the communication target according to the oscillations of the own apparatus and the communication target. The communication target can be more accurately tracked by using the data according to the relative oscillations between the own apparatus and the communication target rather than the data according to the oscillation of only the own apparatus.

The condition storage unit 172 stores a phase image corresponding to an image formed by projection light (spatial light signal) transmitted to the transmitter 11. For example, the condition storage unit 172 stores patterns of a shift image for changing the display position of the phase image and a virtual lens image for enlarging the phase image. The patterns stored in the condition storage unit 172 are set in the modulation part 1120 of the spatial light modulator 112 of the transmitter 11. The condition storage unit 172 also stores projection conditions including a light source control condition for controlling the light source 111 of the transmitter 11 and a modulator control condition for controlling the spatial light modulator 112 of the transmitter 11. The light source control condition is a condition including a timing with which the illumination light is emitted from the light source 111 of the transmitter 11. The modulator control condition is a condition for setting patterns in the modulation part 1120 of the spatial light modulator 112. The light source control condition and the modulator control condition are cooperatively controlled to project projection light corresponding to the patterns set in the modulation part 1120 of the spatial light modulator 112.

The transmission condition generation unit 173 acquires the transmission target signal from the signal generation unit 177. The transmission condition generation unit 173 also acquires a tracking pattern according to the oscillations of the communication apparatus 10 and the communication target from the oscillation analysis unit 171. The transmission condition generation unit 173 generates a transmission condition for transmitting the transmission target signal toward the position of the communication target according to the tracking pattern, based on the condition stored in the condition storage unit 172. For example, the transmission condition generation unit 173 selects a pattern for transmitting the transmission target signal, based on the projection condition stored in the condition storage unit 172. For example, the transmission condition generation unit 173 generates the transmission condition for setting the pattern corresponding to the image to be displayed by the projection light projected as the transmission target signal in the modulation part 1120 of the spatial light modulator 112. For example, the transmission condition generation unit 173 generates the transmission condition for setting the phase image corresponding to the image to be projected in the modulation part 1120 of the spatial light modulator 112, in accordance with the aspect ratio of the modulation region set in the modulation part 1120 of the spatial light modulator 112.

The transmission control unit 174 outputs a transmission instruction for controlling the light source 111 and the spatial light modulator 112 of the transmitter 11 to the transmitter 11, based on the transmission condition set by the transmission condition generation unit 173. The transmitter 11 transmits projection light (spatial light signal) in response to the transmission instruction.

The signal acquisition unit 175 acquires the signal decoded by the receiver 13 from the receiver 13. The signal acquisition unit 175 also acquires, from the receiver 13, the signal that has been subjected to signal processing by the receiver 13. For example, the signal acquired by the signal acquisition unit 175 includes a response signal transmitted from a scanned communication target or a communication target in communication according to the spatial light signal transmitted from the communication apparatus 10. The signal acquisition unit 175 outputs the acquired signal to the signal analysis unit 176. If the signal decoded by the receiver 13 includes the measurement value related to the oscillation of the communication target, the signal acquisition unit 175 outputs the measurement value related to the oscillation of the communication target to the oscillation analysis unit 171.

The signal analysis unit 176 analyzes the signal acquired by the signal acquisition unit 175. For example, the signal analysis unit 176 analyzes information included in the signal according to the type of the signal. For example, the type of signal includes a scan signal and a communication signal. The scan signal is a signal used for searching for a communication target. The communication signal is a signal used for communication with the searched communication target. The type of the signal analyzed by the signal analysis unit 176 is not particularly limited. The signal analysis unit 176 outputs the analysis result of the signal to the signal generation unit 177.

The signal generation unit 177 acquires the analysis result of the signal from the signal analysis unit 176. The signal generation unit 177 also acquires the measurement value regarding the oscillation of the own apparatus from the oscillation analysis unit 171. The signal generation unit 177 generates a transmission target signal according to the analysis result of the signal. The transmission target signal includes the content of communication with the communication target and the content used for scanning the communication target. The transmission target signal includes a measurement value related to oscillation of the own apparatus. If there is a plurality of communication targets, the signal generation unit 177 generates a transmission target signal for each communication target. The signal generation unit 177 outputs the generated transmission target signal to the transmission condition generation unit 173.

<Oscillation Analysis Unit>

Next, an example of a configuration of the oscillation analysis unit 171 included in the communication control unit 17 will be described with reference to the drawings. Hereinafter, an example of generating a tracking pattern according to a relative positional relationship between the own apparatus (communication apparatus 10) and the communication target based on the oscillation of the own apparatus and the communication target will be described.

Figure 8:
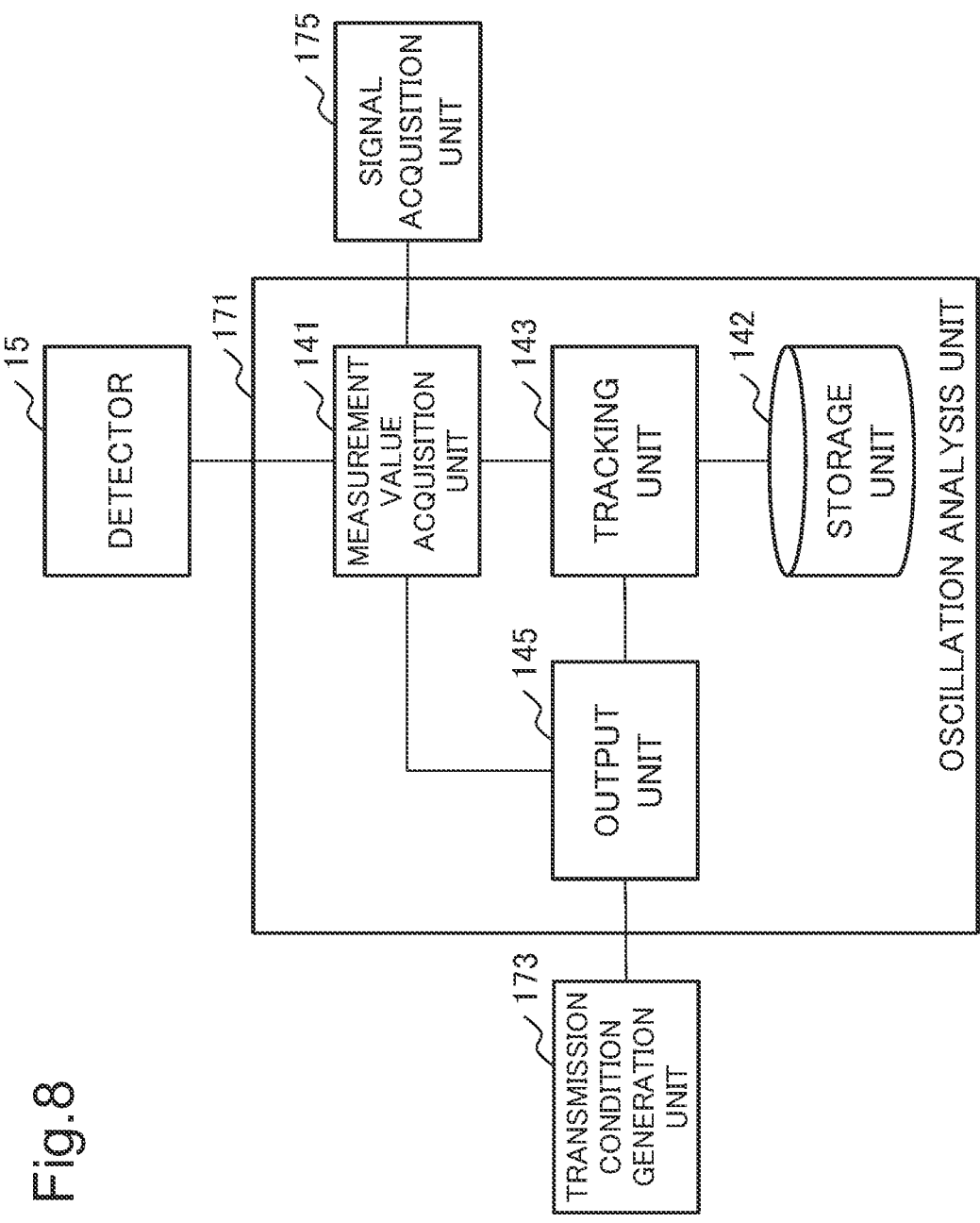
FIG. 8 is a block diagram illustrating an example of a configuration of an oscillation analysis unit contained in the communication control unit included in the communication apparatus according to the first example embodiment.

FIG. 8 is a block diagram illustrating an example of a configuration of the oscillation analysis unit 171. The oscillation analysis unit 171 includes a measurement value acquisition unit 141, a storage unit 142, a tracking unit 143, and an output unit 145.

The measurement value acquisition unit 141 acquires a measurement value related to the oscillation of the own apparatus from the detector 15. The measurement value acquisition unit 141 also acquires a measurement value related to the oscillation of the communication target from the signal acquisition unit 175. The measurement value acquisition unit 141 outputs the acquired measurement value to the tracking unit 143 and the output unit 145.

The storage unit 142 stores an estimation model that outputs a relative positional relationship between the own apparatus and the communication target in response to an input of information on the oscillations of the own apparatus and the communication target. If there is a plurality of communication targets, the storage unit 142 stores an esti-mation model for each communication target. The estima-tion model stored in the storage unit 142 is updated by learning as appropriate information on the oscillations of the own apparatus and the communication target. The timing for updating the estimation model is not particularly limited.

The tracking unit 143 acquires the information on the oscillations of the own apparatus and the communication target. The tracking unit 143 inputs the information on the oscillations of the own apparatus and the communication target to the estimation model stored in the storage unit 142. The tracking unit 143 estimates the position of the commu-nication target using the relative positional relationship between the own apparatus and the communication target output from the estimation model. The position of the communication target estimated by the tracking unit 143 corresponds to a relative position of the communication target as viewed from the own apparatus. The tracking unit 143 estimates the position of the communication target at a time point at which the spatial light signal transmitted at the next transmission timing reaches the communication target. The tracking unit 143 generates tracking data based on the position of the communication target in accordance with the estimation result of the tracking unit 143.

For example, the tracking unit 143 estimates spatial position coordinates of the communication target. The spa-tial position coordinates of the communication target vary according to the oscillation of the communication target. The tracking unit 143 generates tracking data including the position coordinates. In this case, at the next transmission timing, the communication apparatus 10 transmits the spa-tial light signal for the communication target toward the position coordinates.

For example, the tracking unit 143 estimates a trajectory indicating changes in the spatial position of the communi-cation target. The trajectory indicating the variations of the spatial position of the communication target corresponds to a pattern tracing the position varying according to the oscillation of the communication target. The variations of the position of the communication target estimated by the tracking unit 143 are not limited to those described herein. The tracking unit 143 generates tracking data including position coordinates included in the trajectory. In this case, at the next transmission timing, the communication appara-tus 10 transmits the spatial light signal for the communica-tion target toward the position coordinates. For example, the communication apparatus 10 may transmit a spatial light signal including a plurality of light fluxes toward the tra-jectory. In this way, the communication target can be grasped by a plane, the accuracy with which the spatial light signal is received by the communication target is improved.

The output unit 145 acquires the tracking data from the tracking unit 143. The output unit 145 also acquires the measurement value of the own apparatus from the measure-ment value acquisition unit 141. The output unit 145 adds the measurement value of the own apparatus to the tracking data. The measurement value includes the time when the measurement value was measured. For example, the output unit 145 may add the measurement value of the communi-cation target to the tracking data. The output unit 145 outputs the tracking data to the transmission condition generation unit 173. The output tracking data is used to set the trans-mission direction of the spatial light signal at the next transmission timing of the spatial light signal.

[Oscillation]

Figure 9:
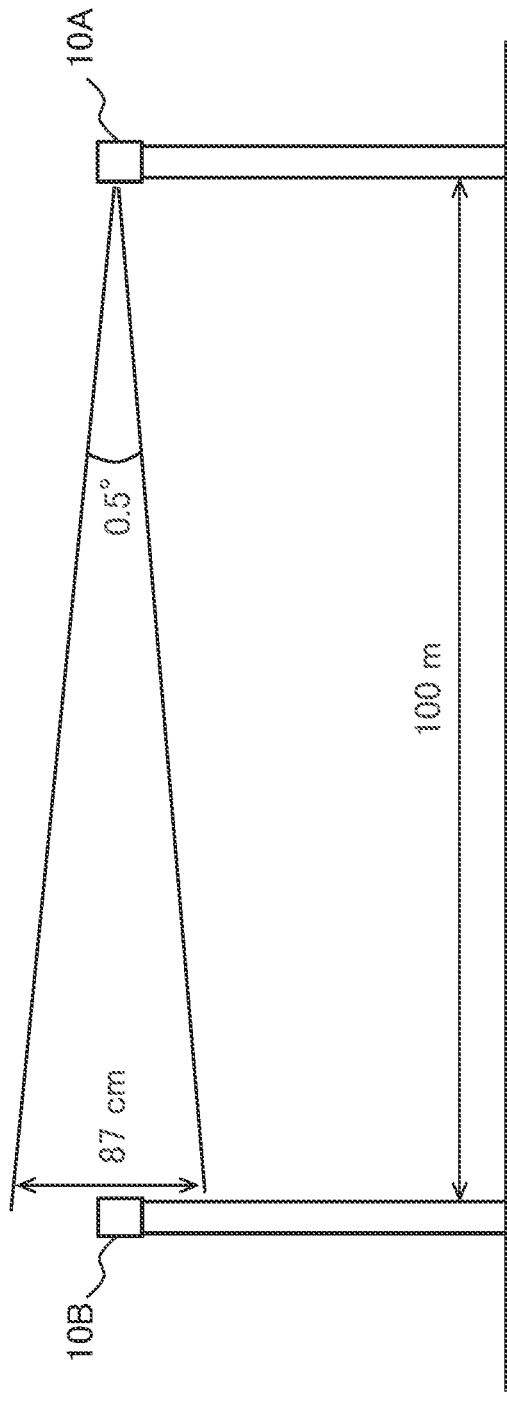
FIG. 9 is a conceptual diagram for describing an arrangement example of the communication apparatus according to the first example embodiment.

Next, the oscillation of the communication apparatus 10 will be described with reference to the drawings. FIG. 9 is a conceptual diagram for describing an example of trans-mission and reception of a spatial light signal between a communication apparatus 10A and a communication appa-ratus 10B. The communication apparatus 10A and the com-munication apparatus 10B are arranged in an on-pole space such as on a utility pole or an electric light.

In the example of FIG. 9, the communication apparatus 10A horizontally transmits a spatial light signal at a projec-tion angle of 0.5 degree in a vertical plane. The distance between the communication apparatus 10A and the commu-nication apparatus 10B is 100 m (meters). The irradiation range of the spatial light signal transmitted from the com-munication apparatus 10A extends up to 87 cm (centimeters) in a vertical plane at the position of the communication apparatus 10B. That is, the irradiation range of the spatial light signal transmitted from the communication apparatus 10A is shifted by 87 cm in the vertical plane at the position of the communication apparatus 10B only by the 0.5-degree displacement of the projection direction.

Figure 10:
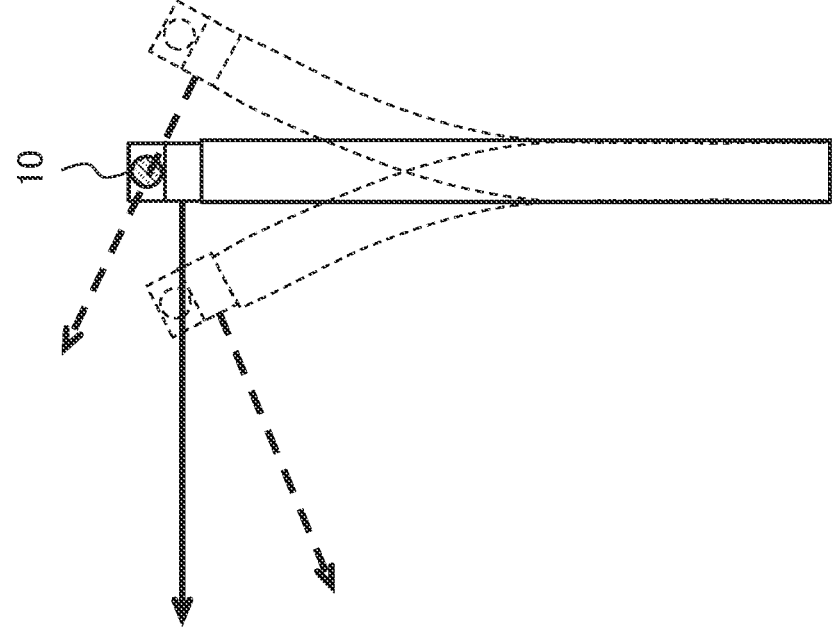
FIG. 10 is a conceptual diagram for describing an example of oscillation of the communication apparatus according to the first example embodiment.

FIG. 10 is a conceptual diagram for describing the oscil-lation of the communication apparatus 10. FIG. 10 illustrates an example in which the communication apparatus 10 oscillates in the plane of paper. As illustrated in FIG. 10, the transmission direction of the spatial light signal varies according to the oscillation of the communication apparatus 10. If the communication target is not included in the irradiation range of the spatial light signal transmitted from the communication apparatus 10, the spatial light signal is not received by the communication target. In such a case, the communication between the communication apparatus 10 and the communication target is interrupted. In the present example embodiment, the communication between the com-munication apparatus 10 and the communication target is continued by changing the transmission direction of the spatial light signal in accordance with the oscillation of the communication apparatus 10.

Figure 11:
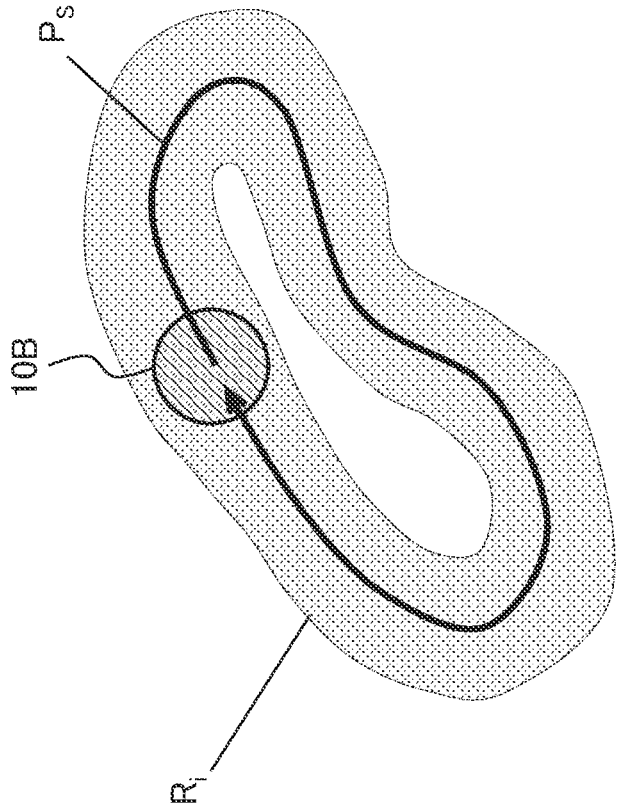
FIG. 11 is a conceptual diagram for describing an example of an oscillation pattern of a communication target viewed from the communication apparatus according to the first example embodiment.

FIG. 11 is a conceptual diagram illustrating an example of a trajectory of the communication apparatus 10 according to the oscillation. FIG. 11 illustrates a trajectory $P_S$ of the communication target (communication apparatus 10B) viewed from the communication apparatus 10A. In the example of FIG. 11, an irradiation range $R_i$ of the spatial light signal transmitted from the communication apparatus 10A is illustrated in accordance with a trajectory $P_S$ of the communication apparatus 10B. If the irradiation range $R_i$ of the spatial light signal transmitted from the communication apparatus 10A can be tracked in accordance with the tra-jectory $P_S$ of the communication apparatus 10B, the com-munication between the communication apparatus 10A and the communication apparatus 10B is not interrupted. Actu-ally, it is difficult to keep accurate tracking the irradiation range $R_i$ in accordance with the trajectory $P_S$ of the com-munication apparatus 10B. However, if the irradiation range $R_i$ is adjusted to a position included in the trajectory $P_S$ of the communication apparatus 10B, the communication is expected to be recovered even if the communication is temporarily interrupted. In addition, if a spatial light signal including a plurality of light fluxes is transmitted from the communication apparatus 10A toward a plurality of posi-tions included in the trajectory $P_S$ of the communication apparatus 10B, a period during which the communication is interrupted is shortened. In the present example embodi-ment, a period during which communication is interrupted can be shortened by tracking the position of the communi-cation target according to the oscillation.

Figure 12:
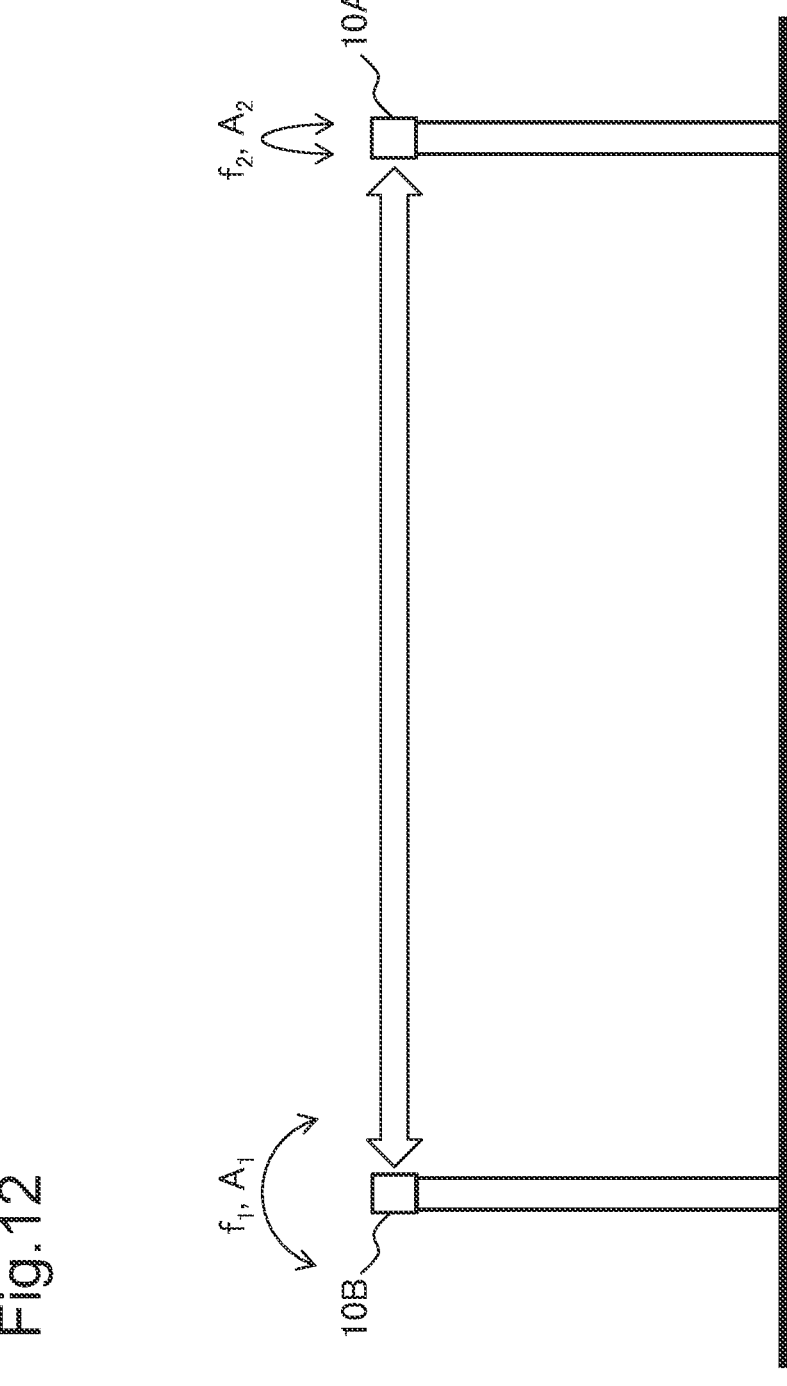
FIG. 12 is a conceptual diagram for describing an example of oscillations of the communication apparatus according to the first example embodiment and the communication target.

FIG. 12 is a conceptual diagram for describing an example in which the communication apparatuses 10 exchange information on their oscillations. FIG. 12 illustrates an example in which the communication apparatus 10A and the communication apparatus 10B oscillate in different patterns. The communication apparatus 10A periodically oscillates at a vibration frequency $f_2$ and with an amplitude $A_2$ in a plane perpendicular to the surface of paper. The communication apparatus 10B periodically oscillates at a vibration frequency $f_1$ and with an amplitude $A_1$ in a plane parallel to the surface of paper. If the communication apparatus 10A and the communication apparatus 10B exchange information on their oscillations, the position of the communication target can be calculated according to the information as long as communication is continued. Even if the communication is interrupted, the direction of the communication target can be estimated based on the information on the oscillation. Therefore, even if the communication with the communication target is interrupted, the communication can be easily restored.

Figure 13:
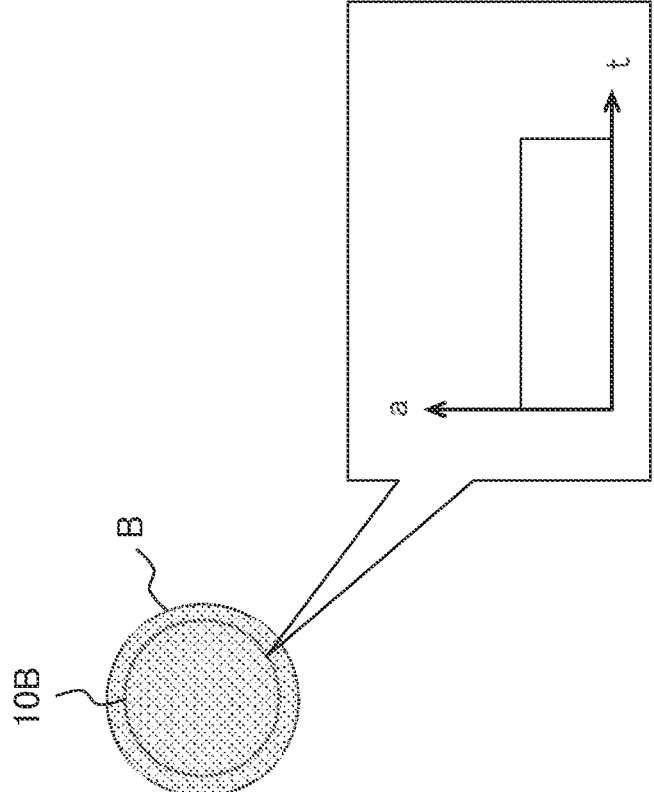
FIG. 13 is a conceptual diagram illustrating an example in which the communication target at rest is irradiated with a spatial light signal transmitted from the communication apparatus according to the first example embodiment.

FIG. 13 is a conceptual diagram illustrating an example of irradiation of a spatial light signal in a state with no oscillation. In the example of FIG. 13, the communication target (communication apparatus 10B) is stationary as viewed from the communication apparatus 10A that is the transmitter of the spatial light signal. In the example of FIG. 13, the communication apparatus 10B is included in the range of an irradiation range B of the spatial light signal. The reception intensity of the spatial light signal received by the communication apparatus 10B is indicated in the balloon. In the example in FIG. 13, the communication apparatus 10B receives the spatial light signal with a constant reception intensity.

Figure 14:
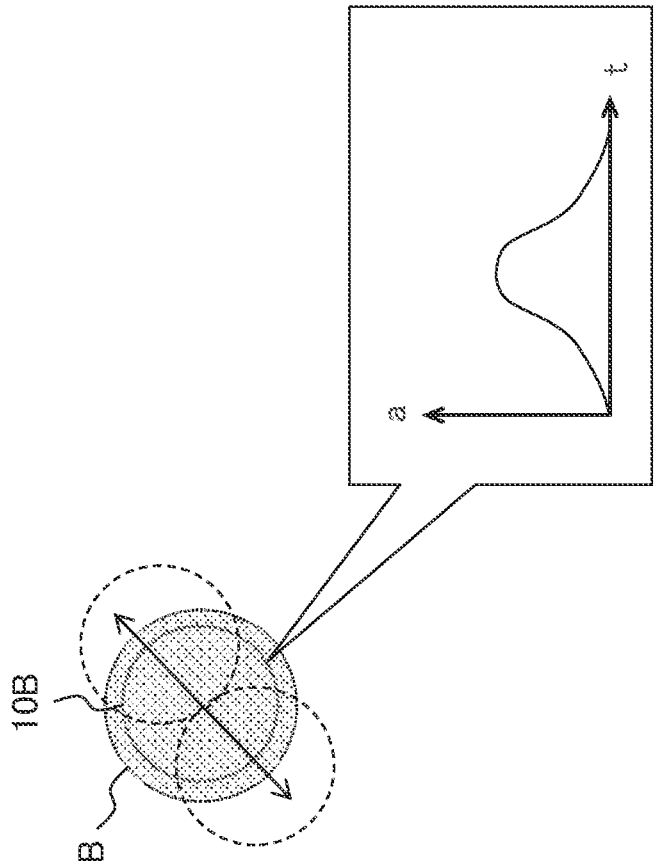
FIG. 14 is a conceptual diagram illustrating an example in which the communication target in oscillation is irradiated with a spatial light signal transmitted from the communication apparatus according to the first example embodiment.

FIG. 14 is a conceptual diagram illustrating an example of irradiation of a spatial light signal in a state with oscillation. In the example in FIG. 14, the communication target (communication apparatus 10B) oscillates along one direction as viewed from the communication apparatus 10A that is the transmitter of the spatial optical signal. In the example in FIG. 14, there is a period in which the communication apparatus 10B protrudes beyond the range of the irradiation range B of the spatial light signal. The reception intensity of the spatial light signal received by the communication apparatus 10B is indicated in the balloon. In the example in FIG. 14, the reception intensity of the spatial light signal received by the communication apparatus 10B varies according to the oscillation. Transmitting the spatial light signal in accordance with the oscillation of the communication apparatus 10B makes it possible to suppress the fluctuation of the reception intensity of the spatial light signal received by the communication apparatus 10B. For example, the communication apparatus 10A that is the transmitter may be configured to detect the oscillation according to the fluctuation in the reception intensity of the spatial light signal. In that case, the communication apparatus 10A can continue the communication by exchanging information on the detected oscillation with the communication apparatus 10B and controlling the transmission direction of the spatial light signal according to the oscillation.

Figure 15:
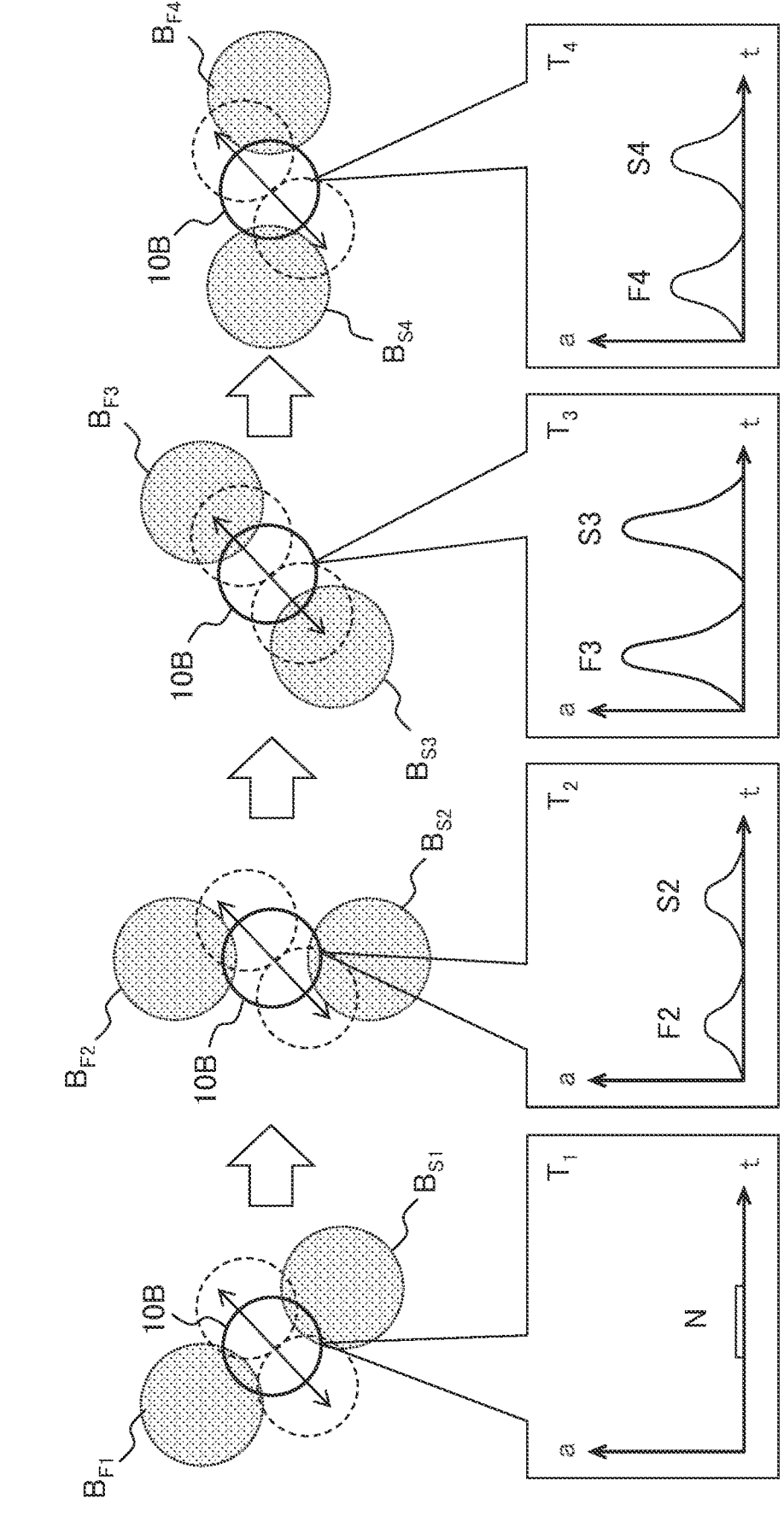
FIG. 15 is a conceptual diagram illustrating an example in which a spatial light signal for scanning is transmitted from the communication apparatus according to the first example embodiment.

FIG. 15 is a conceptual diagram for describing an example of tracking of a communication target using a spatial light signal including a plurality of light fluxes. FIG. 15 illustrates an example in which the communication apparatus 10A follows the communication target (communication apparatus 10B) using a scanning spatial light signal including two light fluxes. In the example in FIG. 15, the communication apparatus 10B oscillates along a direction from the upper right to the lower left of the paper surface. FIG. 15 illustrates, in the balloons, temporal changes in the reception intensity of the spatial light signal received by the communication apparatus 10B.

The communication apparatus 10A that is the transmitter transmits scanning spatial light signals toward two irradiation ranges (irradiation range $B_F$ and irradiation range $B_S$). The irradiation range $B_F$ and the irradiation range $B_S$ are irradiated with spatial light signals emitted from different light emitters. The communication apparatus 10A transmits a spatial light signal to which an identifier F is given, to the irradiation range $B_F$. The communication apparatus 10A also transmits a spatial light signal to which an identifier S is given, to the irradiation range $B_S$. The communication apparatus 10B that is the transmission destination distinguishes the spatial light signals emitted to the two irradiation ranges according to the identifiers given to the spatial light signals. FIG. 15 illustrates a state in which the position irradiated with the pair of the irradiation range $B_F$ and the irradiation range $B_S$ is rotated around the intermediate position between the irradiation range $B_F$ and the irradiation range $B_S$.

In an irradiation period $T_1$, the communication apparatus 10A that is the transmitter transmits the spatial light signals in such a way that the irradiation range $B_{F1}$ and the irradiation range $B_{S1}$ are arranged along the direction from the upper left to the lower right of the paper surface. In this case, the angle formed by the straight line connecting the irradiation range $B_{F1}$ and the irradiation range $B_{S1}$ and the oscillation direction of the communication apparatus 10B is about 90 degrees. In the irradiation period $T_1$, the communication apparatus 10B receives the spatial light signal at the level of noise N.

In the irradiation period $T_2$, the communication apparatus 10A that is the transmitter transmits the spatial light signals in such a way that the irradiation range $B_{F2}$ and the irradiation range $B_{S2}$ are arranged along the direction from the top to the bottom of the paper surface. In this case, the angle formed by the straight line connecting the irradiation range $B_{F2}$ and the irradiation range $B_{S2}$ and the oscillation direction of the communication apparatus 10B is about 45 degrees. In the irradiation period $T_2$, the communication apparatus 10B receives a spatial light signal F2 emitted to the irradiation range $B_{F2}$ and a spatial light signal S2 emitted to the irradiation range $B_{S2}$. The communication apparatus 10B distinguishes the spatial light signal F2 emitted to the irradiation range $B_{F2}$ and the spatial light signal S2 emitted to the irradiation range $B_{S2}$, by identifiers.

In the irradiation period $T_3$, the communication apparatus 10A that is the transmitter transmits the spatial light signals in such a way that the irradiation range $B_{F3}$ and the irradiation range $B_{S3}$ are arranged along the direction from the upper right to the lower left of the paper surface. In this case, the straight line connecting the irradiation range $B_{F3}$ and the irradiation range $B_{S3}$ coincides with the oscillation direction of the communication apparatus 10B. In the irradiation period $T_3$, the communication apparatus 10B receives a spatial light signal F3 emitted to the irradiation range $B_{F3}$ and a spatial light signal S3 emitted to the irradiation range $B_{S3}$. The communication apparatus 10B distinguishes the spatial light signal F3 emitted to the irradiation range $B_{F3}$ and the spatial light signal S3 emitted to the irradiation range $B_{S3}$, by identifiers.

In an irradiation period $T_4$, the communication apparatus 10A that is the transmitter transmits the spatial light signals in such a way that the irradiation range $B_{F4}$ and the irradiation range $B_{S4}$ are arranged along the direction from the left to the right of the paper surface. In this case, the angle formed by the straight line connecting the irradiation range $B_{F4}$ and the irradiation range $B_{S4}$ and the oscillation direction of the communication apparatus 10B is about 45 degrees. In the irradiation period $T_4$, the communication apparatus 10B receives a spatial light signal F4 emitted to the irradiation range $B_{F4}$ and a spatial light signal S4 emitted to the irradiation range $B_{S4}$. The communication apparatus 10B distinguishes the spatial light signal F4 emitted to the irradiation range $B_{F4}$ and the spatial light signal S4 emitted to the irradiation range $B_{S4}$, by identifiers.

In the example in FIG. 15, the reception intensity of the spatial light signal in the irradiation period $T_3$ is the highest. The communication apparatus 10B transmits a spatial light signal (response signal) for notifying that the spatial light signal having the highest reception intensity has been received in the irradiation period $T_3$ to the communication apparatus 10A that is the transmitter of the spatial light signal. The communication apparatus 10A that has received the response signal can determine that the direction of the straight line connecting the irradiation range $B_{F3}$ irradiated with the spatial light signal transmitted in the irradiation period $T_3$ and the irradiation range $B_{S3}$ is the direction of oscillation of the communication target (communication apparatus 10B) viewed from the own apparatus (communication apparatus 10A).

Figure 16:
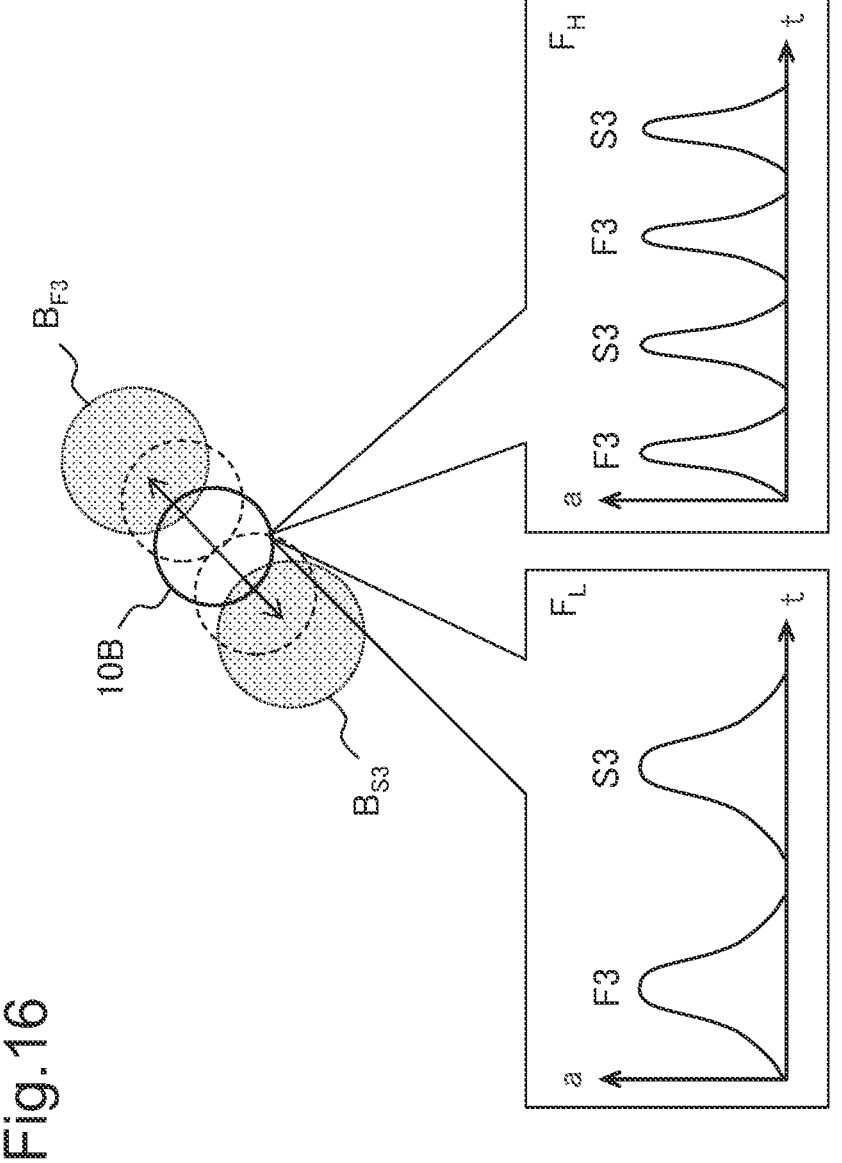
FIG. 16 is a conceptual diagram illustrating an example in which the communication apparatus according to the first example embodiment measures the vibration frequency of the oscillation of the communication target.

FIG. 16 is a conceptual diagram for describing an example of measuring a vibration frequency of the oscillation of the communication target. FIG. 16 illustrates an example in which the vibration frequency of the oscillation is measured after the direction of oscillation of the communication target (communication apparatus 10B) viewed from the communication apparatus 10A is determined by the procedure illustrated in FIG. 15. The communication apparatus 10A transmits spatial optical signals at different frequencies. FIG. 16 illustrates, in the balloons, temporal changes in the reception intensity of the spatial light signal received by the communication apparatus 10B that is the transmission destination.

The communication apparatus 10A that is the transmitter transmits scanning spatial light signals toward two irradiation ranges (irradiation range $B_{F4}$ and irradiation range $B_{S3}$). The irradiation range $B_{F3}$ and the irradiation range $B_{S3}$ are irradiated with spatial light signals emitted from different light emitters. The communication apparatus 10A transmits a spatial light signal to which an identifier F is given, to the irradiation range $B_{F3}$. The communication apparatus 10A also transmits a spatial light signal to which an identifier S is given, to the irradiation range $B_{S3}$. The communication apparatus 10B distinguishes the spatial light signals emitted to the two irradiation ranges according to the identifiers given to the spatial light signals.

FIG. 16 illustrates an example in which a spatial light signal at a frequency $F_L$ and a spatial light signal at a frequency $F_H$ are transmitted. The frequency $F_L$ is a low frequency, and the frequency $F_H$ is a high frequency. The communication apparatus 10B receives the spatial light signal with an identifier F and the spatial light signal with an identifier S at intervals corresponding to the frequencies of the spatial light signals. The communication apparatus 10B receives the spatial light signal at intervals corresponding to the vibration frequency of the oscillation of the own apparatus (communication apparatus 10B) with respect to the communication apparatus 10A. The vibration frequency of the oscillation of the own apparatus (communication apparatus 10B) with respect to the communication apparatus 10A can be calculated by measuring the reception intervals of the spatial light signal at each frequency.

Figure 17:
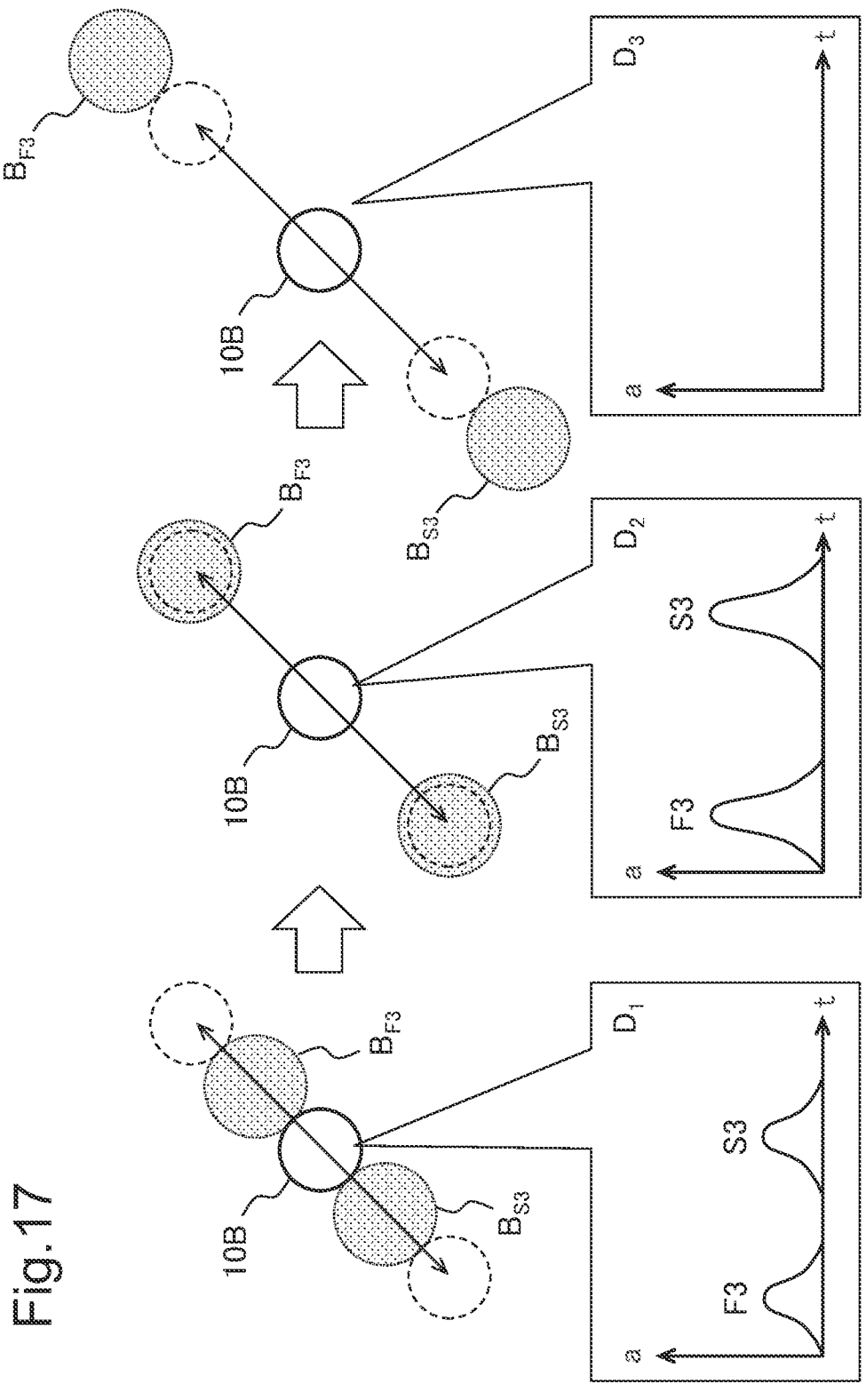
FIG. 17 is a conceptual diagram illustrating an example in which the communication apparatus according to the first example embodiment measures the amplitude of the oscillation of the communication target.

FIG. 17 is a conceptual diagram for describing an example of measuring the amplitude of the oscillation of the communication target. FIG. 17 illustrates an example in which the amplitude of the oscillation is measured after the direction of oscillation of the communication target (communication apparatus 10B) viewed from the communication apparatus 10A is determined by the procedure illustrated in FIG. 15. FIG. 17 illustrates, in the balloons, temporal changes in the reception intensity of the spatial light signal received by the communication apparatus 10B.

The communication apparatus 10A that is the transmitter transmits scanning spatial light signals toward two irradiation ranges (irradiation range $B_{F3}$ and irradiation range $B_{S3}$). The communication apparatus 10A transmits the spatial light signal while changing the interval between the irradiation range $B_{F3}$ and the irradiation range $B_{S3}$. The irradiation range $B_{F3}$ and the irradiation range $B_{S3}$ are irradiated with spatial light signals emitted from different light emitters. The communication apparatus 10A transmits a spatial light signal to which an identifier F is given, to the irradiation range $B_{F3}$. The communication apparatus 10A also transmits a spatial light signal to which an identifier S is given, to the irradiation range $B_{S3}$.

The interval $D_1$ (left) between the irradiation range $B_{F3}$ and the irradiation range $B_S$ is smaller than the amplitude of the oscillation of the communication apparatus 10B. The interval $D_2$ (center) between the irradiation range $B_{F3}$ and the irradiation range $B_S$ coincides with the amplitude of the oscillation of the communication apparatus 10B. The interval $D_3$ (right) between the irradiation range $B_{F3}$ and the irradiation range $B_S$ is larger than the amplitude of the oscillation of the communication apparatus 10B. In this case, the reception intensity of the spatial light signal is maximum at the interval $D_2$ (center). That is, the amplitude of the oscillation of the communication apparatus 10B corresponds to the interval $D_2$.

Figure 18:
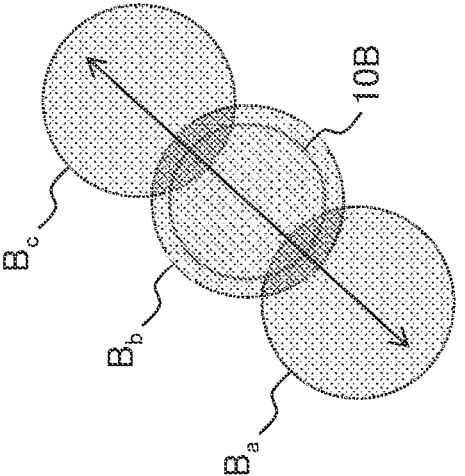
FIG. 18 is a conceptual diagram illustrating an example in which the communication apparatus according to the first example embodiment emits a spatial light signal in accordance with the oscillation of the communication target.

FIG. 18 is a conceptual diagram illustrating an example in which the communication apparatus 10 transmits spatial light signals in accordance with the amplitude of the oscillation determined in FIG. 17. In the example of FIG. 18, the communication apparatus 10A transmits spatial light signals toward three irradiation ranges (irradiation range $B_a$, irradiation range $B_b$, irradiation range $B_c$) in accordance with the oscillation direction of the communication target (communication apparatus 10B). FIG. 18 illustrates the oscillation direction of the communication apparatus 10B by arrows. The communication apparatus 10A transmits spatial light signals to the irradiation range $B_a$, the irradiation range $B_b$, and the irradiation range $B_c$ using different light emitters. The interval between the irradiation range $B_a$ and the irradiation range $B_c$ coincides with the amplitude of the oscillation of the communication apparatus 10B. Therefore, even if the oscillating communication apparatus 10B is at any position, the spatial light signal emitted to any one of the irradiation range $B_a$, the irradiation range $B_b$, and the irradiation range $B_c$ is continuously received by the communication apparatus 10B.

Figure 19:
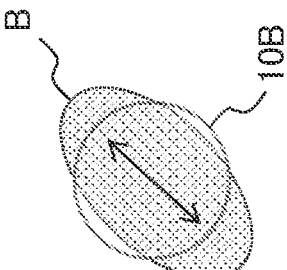
FIG. 19 is a conceptual diagram illustrating an example in which the communication apparatus according to the first example embodiment deforms a dot displayed by the spatial light signal in accordance with the oscillation of the communication target.

FIG. 19 is a conceptual diagram illustrating an example of deforming the irradiation range of the spatial light signal. FIG. 19 illustrates the oscillation direction of the communication target (communication apparatus 10B) by an arrow. In the case of the example of FIG. 19, the irradiation range B of the spatial light signal is extended along the oscillation direction of the communication apparatus 10B. For example, it is possible to transmit the spatial light signal in the irradiation range B as illustrated in FIG. 19 by combining a phase image set in the modulation part 1120 of the spatial light modulator 112 with a virtual lens that enlarges and stretches the projection range of the phase image. As illustrated in FIG. 19, if the irradiation range B of the spatial light signal is extended along the oscillation direction of the communication apparatus 10B, the spatial light signal emitted to the irradiation range B is continuously received by the communication apparatus 10B.

Figure 20:
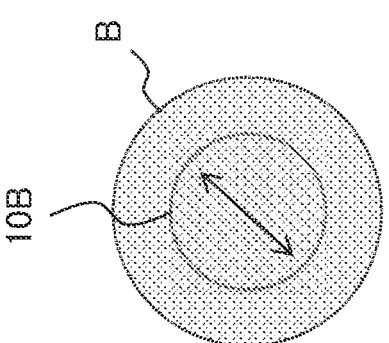
FIG. 20 is a conceptual diagram illustrating an example in which the communication apparatus according to the first example embodiment enlarges a dot displayed by the spatial light signal in accordance with the oscillation of the communication target.

FIG. 20 is a conceptual diagram illustrating another example of deforming the irradiation range of the spatial light signal. FIG. 20 illustrates the oscillation direction of the communication target (communication apparatus 10B) by arrows. In the case of the example in FIG. 20, the irradiation range B of the spatial light signal is enlarged in such a way as to include the range of the oscillating communication apparatus 10B. For example, it is possible to transmit the spatial light signal in the irradiation range B as illustrated in FIG. 20 by combining a phase image set in the modulation part 1120 of the spatial light modulator 112 with a virtual lens that enlarges the projection range of the phase image. As illustrated in FIG. 20, if the irradiation range B of the spatial light signal is enlarged in such a way as to include the range of the oscillating communication apparatus 10B, the spatial light signal emitted to the irradiation range B is continuously received by the communication apparatus 10B.

Figure 21:
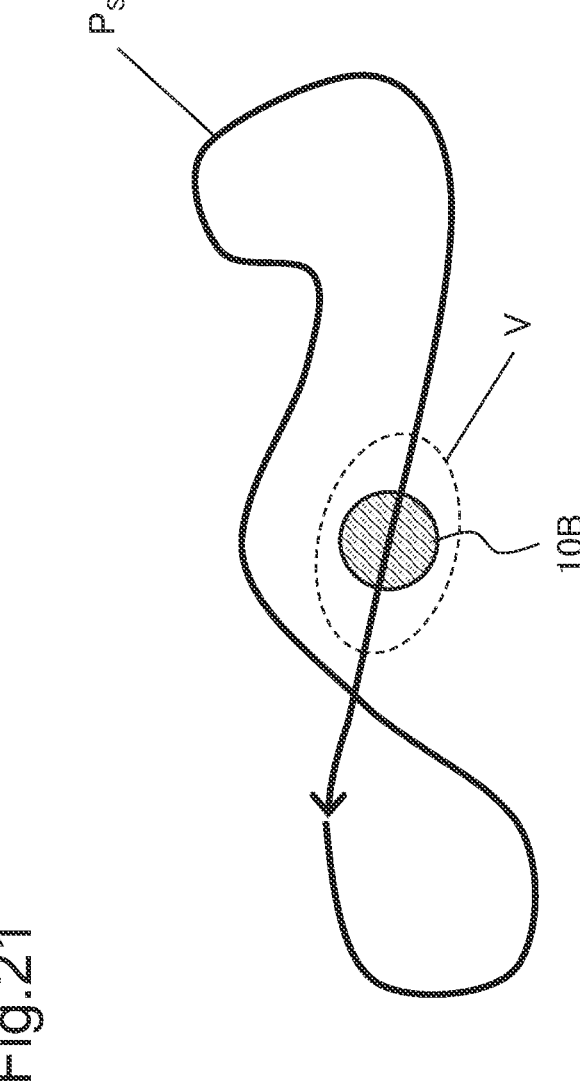
FIG. 21 is a conceptual diagram for describing an example of an oscillation pattern of the communication target viewed from the communication apparatus according to the first example embodiment.

FIG. 21 is a conceptual diagram illustrating an example of a trajectory of the communication apparatus 10 that complicatedly oscillates. FIG. 21 illustrates a trajectory $P_S$ of the communication target (communication apparatus 10B) viewed from the communication apparatus 10A. As illustrated in FIG. 21, if the communication apparatus 10B complicatedly oscillates, the oscillation of the communication apparatus 10B may be estimated in a minute range V including the position of the communication apparatus 10B. No matter how its oscillation is complicated, the communication apparatus 10B begins to oscillate from a stationary state in the most stable position and eventually comes to rest in the most stable position. Therefore, if the direction in which the communication apparatus 10B fluctuates in the minute range V can be determined, the entire trajectory $P_S$ can be grasped by following the direction. For example, the period during which communication is interrupted can be shortened by increasing the number of light emitters included in the light source 111 of the communication apparatus 10A and transmitting spatial light signals toward a plurality of irradiation ranges along the trajectory $P_S$ of the communication apparatus 10B.

Factors that contribute to oscillation of the communication apparatus 10 can be classified into several types. For example, environmental factors such as wind, temperature, humidity, and rain in a place where the communication apparatus 10 is installed may cause the oscillation of the communication apparatus 10. For example, artificial factors such as construction of roads and electric wires performed in the vicinity of the place where the communication apparatus 10 is installed may cause the oscillation of the communication apparatus 10. For example, the natural vibration of the support column on which the communication apparatus 10 is installed may cause the oscillation of the communication apparatus 10. Training an estimation model by using oscillation patterns corresponding to these factors makes it possible to estimate the oscillation of the communication target according to minute changes in the position of the communication target. Furthermore, sequentially training the estimation model by using the factors that causes the oscillation and the oscillation patterns according to the factors improves the accuracy of estimation of the oscillation pattern.

CONTROL EXAMPLES

Next, control examples of the transmitter 11 for transmitting a spatial light signal toward a plurality of irradiation ranges will be described with reference to the drawings. Hereinafter, examples in which the irradiation range of the spatial light signal is changed using the light source 111 including three light emitters will be described.

Control Example 1

FIG. 22 is a table for describing Control Example 1 of a plurality of modulation regions set in the modulation part 1120 of the spatial light modulator 112 and the plurality of light emitters included in the light source 111. FIG. 22 shows correspondences between modulation region and light emitter to be activated in accordance with the timing of transmitting the spatial light signal. A modulation region $R_A$, a modulation region $R_B$, and a modulation region $R_C$ are set in modulation part 1120. The light source 111 includes a light emitter $L_A$, a light emitter $L_B$, and a light emitter $L_C$. The modulation region $R_A$ is irradiated with the illumination light emitted from the light emitter $L_A$. The modulation region $R_B$ is irradiated with the illumination light emitted from the light emitter $L_B$. The modulation region $R_C$ is irradiated with the illumination light emitted from the light emitter $L_C$.

In an irradiation period $T_1$, a phase image $I_A$ is set in the modulation region $R_A$, a phase image $I_B$ is set in the modulation region $R_B$, and a phase image $I_C$ is set in the modulation region $R_C$. In the irradiation period $T_1$, the light emitter $L_A$ is driven (ON), and the light emitter $L_B$ and the light emitter $L_C$ are stopped (OFF). In the irradiation period $T_1$, a spatial light signal of an irradiation pattern according to the phase image $I_A$ set in the modulation region $R_A$ is transmitted.

At the timing of transition from the irradiation period $T_1$ to an irradiation period $T_2$, the light emitter $L_A$ is stopped and the light emitter $L_B$ is driven. That is, in the irradiation period $T_2$, the light emitter $L_B$ is driven, and the light emitter $L_A$ and the light emitter $L_C$ are stopped. The phase image $I_A$ set in the modulation region $R_A$ is switched to a phase image $I_D$ in accordance with the stoppage of the light emitter $L_A$. Therefore, in the irradiation period $T_2$, the phase image $I_D$ is set in the modulation region $R_A$, the phase image $I_B$ is set in the modulation region $R_B$, and the phase image $I_C$ is set in the modulation region $R_C$. In the irradiation period $T_2$, a spatial light signal of an irradiation pattern according to the phase image $I_B$ set in the modulation region $R_B$ is transmitted.

At the timing of transition from the irradiation period $T_2$ to an irradiation period $T_3$, the light emitter $L_B$ is stopped and the light emitter $L_C$ is driven. That is, in the irradiation period $T_3$, the light emitter $L_C$ is driven, and the light emitter $L_A$ and the light emitter $L_B$ are stopped. The phase image $I_B$ set in the modulation region $R_B$ is switched to a phase image $I_E$ in accordance with the stoppage of the light emitter $L_B$. Therefore, in the irradiation period $T_3$, the phase image ID is set in the modulation region $R_A$, the phase image $I_E$ is set in the modulation region $R_B$, and the phase image $I_C$ is set in the modulation region $R_C$. In the irradiation period $T_3$, a spatial light signal of an irradiation pattern corresponding to the phase image $I_C$ set in the modulation region $R_C$ is transmitted.

At the timing of transition from the irradiation period $T_3$ to an irradiation period $T_4$, the light emitter $L_C$ is stopped and the light emitter $L_A$ is driven. That is, in the irradiation period $T_4$, the light emitter $L_A$ is driven, and the light emitter $L_B$ and the light emitter $L_C$ are stopped. Therefore, in the irradiation period $T_4$, the phase image $I_D$ is set in the modulation region $R_A$, the phase image $I_E$ is set in the modulation region $R_B$, and the phase image $I_C$ is set in the modulation region $R_C$. In the irradiation period $T_4$, a spatial light signal of an irradiation pattern corresponding to the phase image $I_D$ set in the modulation region $R_A$ is transmitted.

At the timing of transition from the irradiation period $T_4$ to an irradiation period $T_5$, the light emitter $L_A$ is stopped and the light emitter $L_B$ is driven. That is, in the irradiation period $T_5$, the light emitter $L_B$ is driven, and the light emitter $L_A$ and the light emitter $L_C$ are stopped. Therefore, in the irradiation period $T_5$, the phase image $I_D$ is set in the modulation region $R_A$, the phase image $I_E$ is set in the modulation region $R_B$, and the phase image $I_C$ is set in the modulation region $R_C$. In the irradiation period $T_5$, a spatial light signal of an irradiation pattern according to the phase image $I_E$ set in the modulation region $R_B$ is transmitted.

Figure 23:
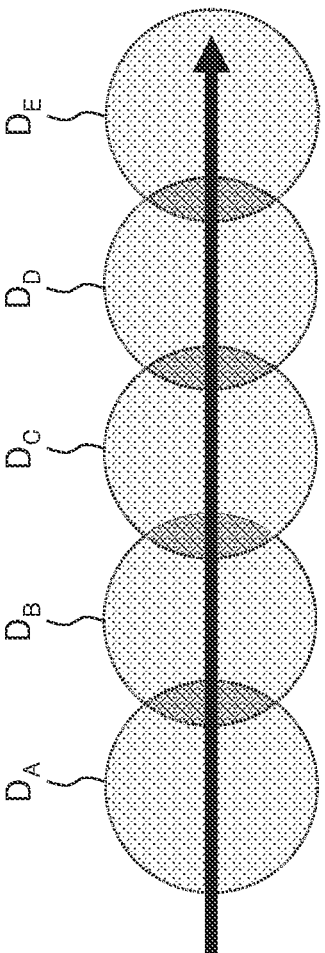
FIG. 23 is a conceptual diagram for describing the transmitter control example 1 by the communication apparatus according to the first example embodiment.

FIG. 23 is a conceptual diagram for describing dots displayed by spatial light signals transmitted under control according to the table of FIG. 22. The spatial light signal transmitted in the irradiation period $T_1$ is displayed as a dot $D_A$. The spatial light signal transmitted in the irradiation period $T_2$ is displayed as a dot $D_B$. The spatial light signal transmitted in the irradiation period $T_3$ is displayed as a dot $D_C$. The spatial light signal transmitted in the irradiation period $T_4$ is displayed as a dot $D_D$. The spatial light signal transmitted in the irradiation period $T_5$ is displayed as a dot $D_E$. The dots D displayed by the spatial light signals are emitted in sequence from the left side to the right side without interruption.

The modulation part 1120 of the spatial light modulator 112 is a liquid crystal panel. Therefore, the phase image set in the modulation region is changed after the response time of the liquid crystal. Control is performed according to the table in FIG. 22 to switch among the active modulation regions in sequence, and replace the phase image in the inactive modulation region in accordance with the response time of the liquid crystal. In this way, the phase images in the inactive modulation region can be replaced before completion of response of the liquid crystal. Therefore, irradiating the communication target with the spatial light signals in the irradiation pattern as illustrated in FIG. 23 without interruption, the dots can be moved following the oscillation.

Control Example 2

FIG. 24 is a table for describing Control Example 2 of a plurality of modulation regions set in the modulation part 1120 of the spatial light modulator 112 and the plurality of light emitters included in the light source 111. In the present control example, the shape of the displayed dot is changed according to the position of the communication target. FIG. 24 shows correspondences between modulation region and light emitter to be activated in accordance with the timing of transmitting the spatial light signal. A modulation region $R_A$ and a modulation region $R_B$ are set in the modulation part 1120. The light source 111 includes a light emitter $L_A$ and a light emitter $L_B$. The modulation region $R_A$ is irradiated with the illumination light emitted from the light emitter $L_A$. The modulation region $R_B$ is irradiated with the illumination light emitted from the light emitter $L_B$.

In an irradiation period $T_1$, a phase image $I_B$ is set in the modulation region $R_A$, and a phase image $I_C$ is set in the modulation region $R_B$. In the irradiation period $T_1$, the light emitter $L_A$ is driven (ON), and the light emitter $L_B$ is stopped (OFF). In the irradiation period $T_1$, a spatial light signal of an irradiation pattern (display $F_B$) corresponding to the phase image $I_B$ set in the modulation region $R_A$ is transmitted.

At the timing of transition from the irradiation period $T_1$ to an irradiation period $T_2$, the light emitter $L_A$ is stopped and the light emitter $L_B$ is driven. That is, in the irradiation period $T_2$, the light emitter $L_B$ is driven, and the light emitter $L_A$ is stopped. In the irradiation period $T_2$, the phase image $I_B$ is set in the modulation region $R_A$, and the phase image $I_C$ is set in the modulation region $R_B$. In the irradiation period $T_2$, a spatial light signal of an irradiation pattern (display $F_C$) corresponding to the phase image $I_C$ set in the modulation region $R_B$ is transmitted.

At the timing of transition from the irradiation period $T_2$ to an irradiation period $T_3$, the light emitter $L_B$ is stopped and the light emitter $L_A$ is driven. That is, in the irradiation period $T_3$, the light emitter $L_A$ is driven, and the light emitter $L_B$ is stopped. The phase image $I_C$ set in the modulation region $R_B$ is switched to a phase image $I_A$ in accordance with the stoppage of the light emitter $L_B$. In the irradiation period $T_3$, the phase image $I_B$ is set in the modulation region $R_A$, and the phase image $I_A$ is set in the modulation region $R_B$. In the irradiation period $T_3$, a spatial light signal of an irradiation pattern (display $F_B$) corresponding to the phase image $I_B$ set in the modulation region $R_A$ is transmitted.

At the timing of transition from the irradiation period $T_3$ to an irradiation period $T_4$, the light emitter $L_A$ is stopped and the light emitter $L_B$ is driven. That is, in the irradiation period $T_4$, the light emitter $L_B$ is driven, and the light emitter $L_A$ is stopped. In the irradiation period $T_4$, the phase image $I_B$ is set in the modulation region $R_A$, and the phase image $I_A$ is set in the modulation region $R_B$. In the irradiation period $T_4$, a spatial light signal of an irradiation pattern (display $F_A$) corresponding to the phase image $I_A$ set in the modulation region $R_B$ is transmitted.

At the timing of transition from the irradiation period $T_4$ to an irradiation period $T_5$, the light emitter $L_B$ is stopped and the light emitter $L_A$ is driven. That is, in the irradiation period $T_5$, the light emitter $L_A$ is driven, and the light emitter $L_B$ is stopped. In the irradiation period $T_5$, the phase image $I_B$ is set in the modulation region $R_A$, and the phase image $I_C$ is set in the modulation region $R_B$. In the irradiation period $T_5$, a spatial light signal of an irradiation pattern (display $F_B$) corresponding to the phase image $I_B$ set in the modulation region $R_A$ is transmitted.

Figure 25:
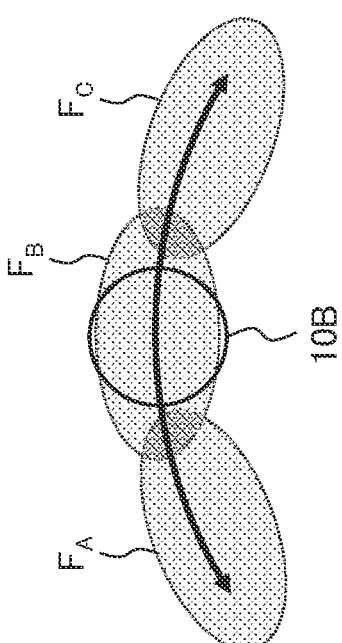
FIG. 25 is a conceptual diagram for describing the transmitter control example 2 by the communication apparatus according to the first example embodiment.

FIG. 25 is a conceptual diagram for describing dots displayed by spatial light signals transmitted under control according to the table of FIG. 24. The spatial light signal transmitted in the irradiation period $T_1$ is displayed as a display $F_B$. The spatial light signal transmitted in the irradiation period $T_2$ is displayed as a display $F_C$. The spatial light signal transmitted in the irradiation period $T_3$ is displayed as a display $F_B$. The spatial light signal transmitted in the irradiation period $T_4$ is displayed as a display $F_A$. The spatial light signal transmitted in the irradiation period $T_5$ is displayed as a display $F_B$. The spatial light signals transmitted in the irradiation period $T_1$, the irradiation period $T_3$, and the irradiation period $T_5$ are displayed in the same display $F_B$ in accordance with the position of the communication target (communication apparatus 10B). The dots D displayed by the spatial light signals are periodically irradiated along the curve of arrows illustrated in FIG. 25.

In the example of FIG. 25, the spatial light signals are transmitted while the emission positions of the spatial light signal are vibrated in an arc shape around the position of the communication apparatus 10B. The display shape can be changed as illustrated in FIG. 25 by setting patterns obtained by combining the virtual lens with the phase image in the modulation part 1120 of the spatial light modulator 112. If the switching time between the display $F_A$ and the display $F_C$ is longer than the response time of the liquid crystal of the modulation part 1120, the patterns in the modulation part 1120 are changed at the stage of switching between the irradiation positions. That is, if two light emitters are included in the light source 111 and two modulation regions can be set in the modulation part 1120 of the spatial light modulator 112, it is possible to periodically switch among the irradiation positions of the spatial light signal.

APPLICATION EXAMPLES

Figure 26:
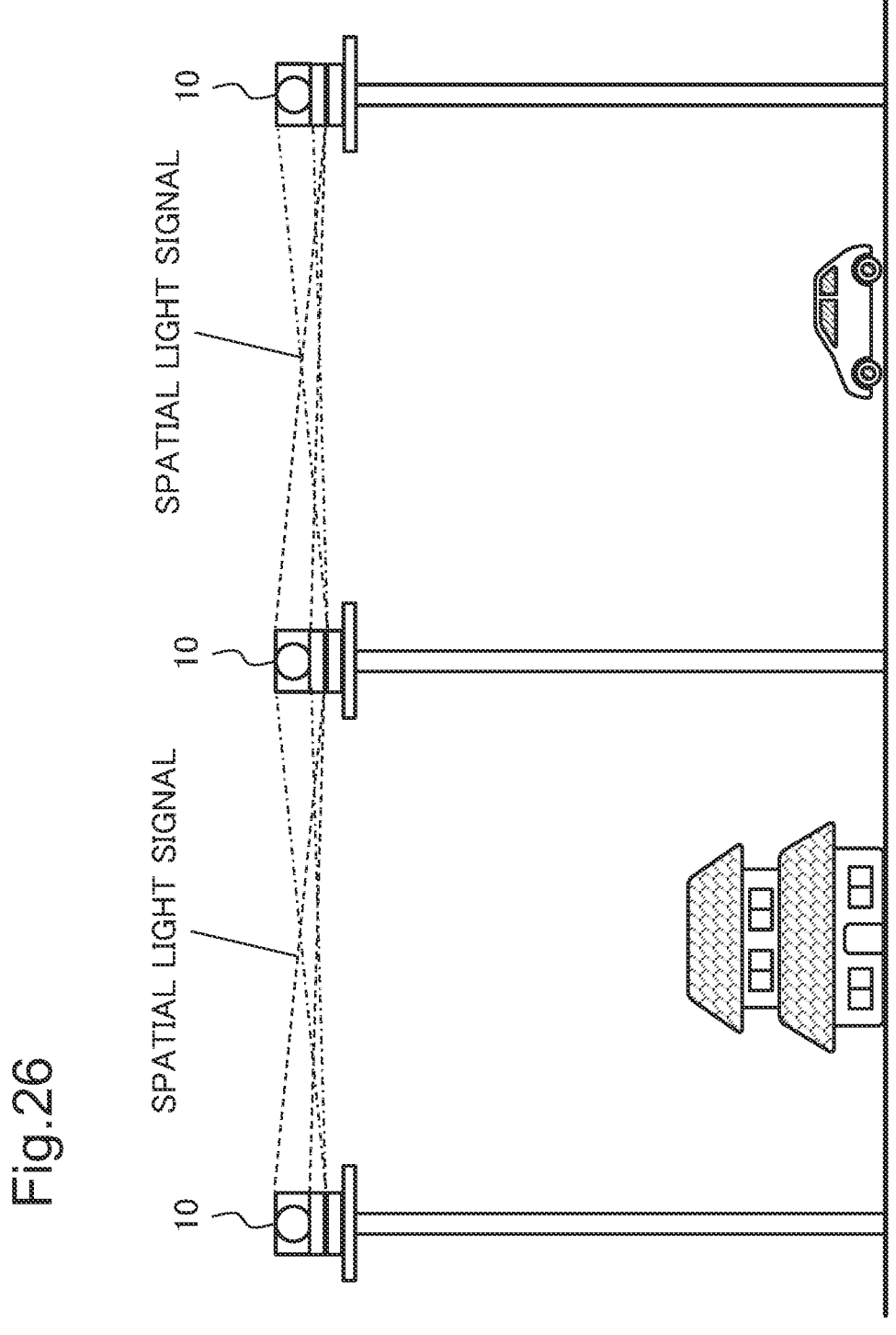
FIG. 26 is a conceptual diagram for describing an example of a communication network according to an application example of the first example embodiment.

Next, application examples of the present example embodiment will be described with reference to the drawings. In the following application example, an example in which a plurality of communication apparatuses 10 transmit and receive spatial light signals will be described. FIG. 26 is a conceptual diagram for describing the present application example. The present application example is an example of a communication network (communication system) in which a plurality of communication apparatuses 10 is arranged on poles (in a space on poles) such as utility poles or street lamps arranged in town will be described.

There are few obstacles in the space on the poles. Therefore, the space on the poles is suitable for installation of the communication apparatus 2. If the communication apparatuses 10 are installed at the same height, the arrival direction of spatial light signals is limited to the horizontal direction. Accordingly, the reception area of each receiver 13 can be reduced, the apparatus can be downsized. A pair of communication apparatuses 10 that transmit and receive spatial light signals is positioned in such a way that at least one communication apparatus 10 can receive a spatial light signal transmitted from the other communication apparatus 10. The pair of communication apparatuses 10 may be arranged to transmit and receive spatial light signals to and from each other. If a communication network of spatial optical signals is formed by the plurality of communication apparatuses 10, the communication apparatus 10 positioned in the middle may be configured to relay the spatial optical signal transmitted from another communication apparatus 10 to still another communication apparatus 10.

According to the present application example, it is possible to perform optical spatial communication using spatial optical signals among the plurality of communication apparatuses 10 arranged in the space on the poles. For example, in addition to the optical space communication between the communication apparatuses 10, wireless communication using radio waves may be performed between the communication apparatuses 10 and a radio device or a base station installed in an automobile, a house, or the like. For example, the communication apparatuses 10 may be connected to the Internet via communication cables or the like installed on the poles.

As described above, the communication apparatus of the present example embodiment includes the transmitter, the receiver, the detector, and the communication control unit. The transmitter transmits the modulated light modulated by the modulation part of the spatial light modulator as a first spatial light signal. The receiver receives the second spatial light signal transmitted from the communication target. The detector detects physical quantities related to the oscillation of the own apparatus. The communication control unit acquires the physical quantities detected by the detector and the information on the oscillation of the communication target included in the second spatial light signal. The communication control unit analyzes the state of the oscillation of the communication target using the information on the oscillation of the communication target and the physical quantities. The communication control unit sets the transmission condition for the first spatial light signal in the transmitter according to the analyzed state of the oscillation of the communication target.

The communication apparatus of the present example embodiment sets the transmission condition of the spatial light signal (first spatial light signal) according to the state of the oscillation of the communication target. According to the communication apparatus of the present example embodiment, it is possible to continue stable communication even in a situation where the own apparatus or the communication target oscillates, by changing the transmission direction of the spatial light signal in accordance with the oscillation of the communication target.

In one aspect of the present example embodiment, the communication control unit causes the transmitter to transmit the first spatial light signal including data in which the physical quantities detected by the detector are associated with the times when the physical quantities were detected. In this aspect, the first spatial light signal including data in which the physical quantities detected by the detector are associated with the times when the physical quantities were detected is transmitted toward the communication target. Therefore, according to this aspect, the communication target that has received the first spatial light signal can more accurately analyze the state of the oscillation of the communication target that is the transmitter of the first spatial light signal based on the time information.

In one aspect of the present example embodiment, the communication control unit sets the transmission condition for the first spatial light signal in the transmitter according to the state of the relative oscillation of the communication target to the own apparatus. Therefore, according to this aspect, the transmission direction of the first spatial light signal can be easily adjusted to the position of the communication target according to the state of the relative oscillation of the communication target to the own apparatus.

In an aspect of the present example embodiment, the transmitter has a light source including a plurality of light emitters that emit illumination light. The communication control unit sets a plurality of modulation regions in the modulation part of the spatial light modulator included in the transmitter, in association with the plurality of light emitters included in the light source. The communication control unit sets a phase image in each of the plurality of modulation regions. The communication control unit controls the transmission direction of the first spatial light signal by controlling the timing at which the illumination light is emitted from the light emitters associated with the plurality of modulation regions. In this aspect, a first spatial light signal including a plurality of light fluxes is transmitted toward a communication target. Therefore, according to this aspect, since it is possible to interpolate between dots displayed by the first spatial light signal including a single light flux, the state of the oscillation of the communication target can be analyzed more accurately.

In one aspect of the present example embodiment, the communication control unit controls the transmitter in such a way that the display state of a pair of dots displayed by the first spatial light signal derived from the illumination light emitted from the plurality of light emitters changes cooperatively according to a predetermined condition. The communication control unit acquires information on oscillation of the communication target included in the second spatial light signal transmitted from the communication target in response to reception of the first spatial light signal. The communication control unit analyzes the state of the oscillation of the communication target using the information on the oscillation of the communication target and the physical quantities. In this aspect, the first spatial light signal including a plurality of light fluxes is transmitted toward the communication target in such a way that the display state of a pair of dots change cooperatively. Therefore, according to the present example embodiment, the first spatial light signal can be more accurately emitted following the motion of the communication target oscillating in a periodic oscillation pattern.

In one aspect of the present example embodiment, the communication control unit sets a composite image obtained by combining the virtual lens image with the phase image in the modulation region, and deforms the dots emitted to the communication target by the first spatial light signal in accordance with the state of the oscillation of the communication target. In this aspect, the dots emitted to the communication target by the first spatial light signal are deformed in accordance with the state of the oscillation of the communication target. Therefore, according to this aspect, the first spatial light signal can be more accurately emitted following the motion of the oscillating communication target.

In one aspect of the present example embodiment, the communication control unit includes an estimation model that has learned the state of the oscillation of the communication target. The communication control unit inputs the physical quantities detected by the detector and the information on the oscillation of the communication target included in the second spatial light signal, to the estimation model. The communication control unit analyzes the state of the oscillation of the communication target according to the output from the estimation model. The communication control unit updates the estimation model according to the analyzed state of the oscillation of the communication target. According to this aspect, using the estimation model that has learned the state of the oscillation of the communication target makes it possible to accurately emit the first spatial light signal, following the motion of the communication target oscillating in a complicated pattern. In this aspect, the estimation model is updated according to the analyzed state of the oscillation of the communication target.

Therefore, according to this aspect, using the estimation model adapted to the communication target makes it possible to more accurately emit the first spatial light signal, following the motion of the oscillating communication target.

A communication system according to an aspect of the present example embodiment includes a plurality of the above-described communication apparatuses. In the communication system, the plurality of communication apparatuses is arranged to transmit and receive spatial light signals to and from each other. According to this aspect, it is possible to implement a communication network that transmits and receives spatial light signals.

Second Example Embodiment

Next, a communication apparatus according to a second embodiment will be described with reference to the drawings. The communication apparatus of the present embodi-

Figure 27:
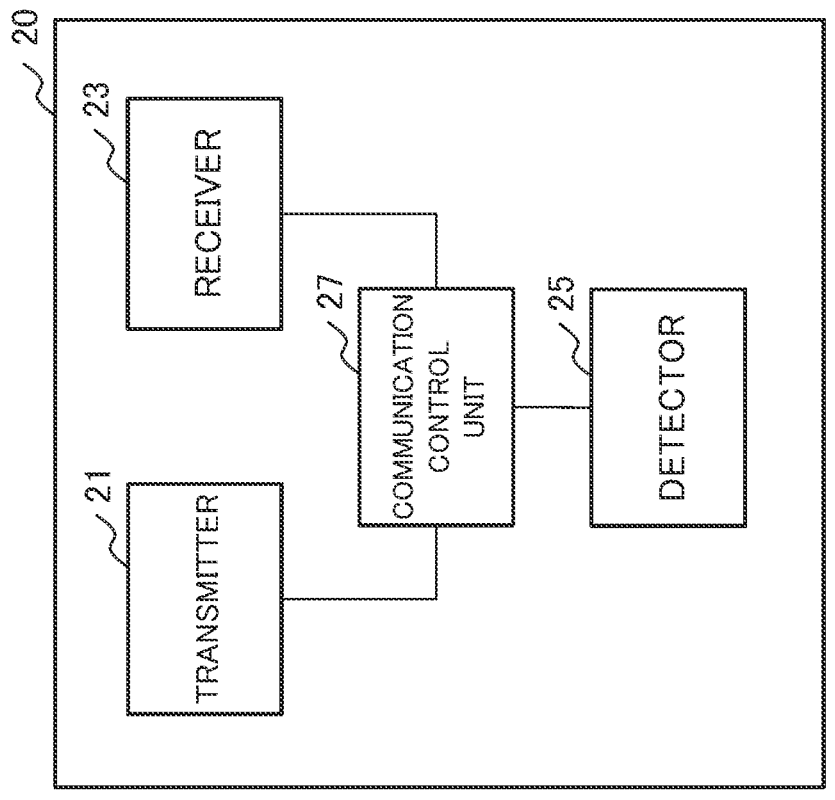
FIG. 27 is a block diagram illustrating an example of a configuration of a communication apparatus according to a second example embodiment.

28 ment has a simplified configuration of the communication apparatus 10 of the first example embodiment. FIG. 27 is a block diagram illustrating an example of a configuration of the communication apparatus 20 according to the present example embodiment. The communication apparatus 20 includes a transmitter 21, a receiver 23, a detector 25, and a communication control unit 27.

The transmitter 21 transmits modulated light modulated by a modulation part of a spatial light modulator as a first spatial light signal. The receiver 23 receives a second spatial light signal transmitted from a communication target. The detector 25 detects physical quantities related to oscillation of the own apparatus. The communication control unit 27 acquires the physical quantities detected by the detector 25 and the information on the oscillation of the communication target included in the second spatial light signal. The communication control unit 27 analyzes the state of oscillation of the communication target using the information on the oscillation of the communication target and the physical quantities. The communication control unit 27 sets a transmission condition for the first spatial light signal in the transmitter 21 according to the analyzed state of the oscillation of the communication target.

The communication apparatus of the present example embodiment sets the transmission condition of the spatial light signal (first spatial light signal) according to the state of the oscillation of the communication target. According to the communication apparatus of the present example embodiment, it is possible to continue stable communication even in a situation where the own apparatus or the communication target oscillates, by changing the transmission direction of the spatial light signal in accordance with the oscillation of the communication target.

(Hardware)

Next, a hardware configuration for executing control and processing according to each example embodiment of the present disclosure will be described with reference to the drawings. Herein, an example of such a hardware configuration is an information processing apparatus 90 (computer) in FIG. 28. The information processing apparatus 90 in FIG. 28 is taken as a configuration example for executing control and processing in each embodiment, and does not limit the scope of the present disclosure.

Figure 28:
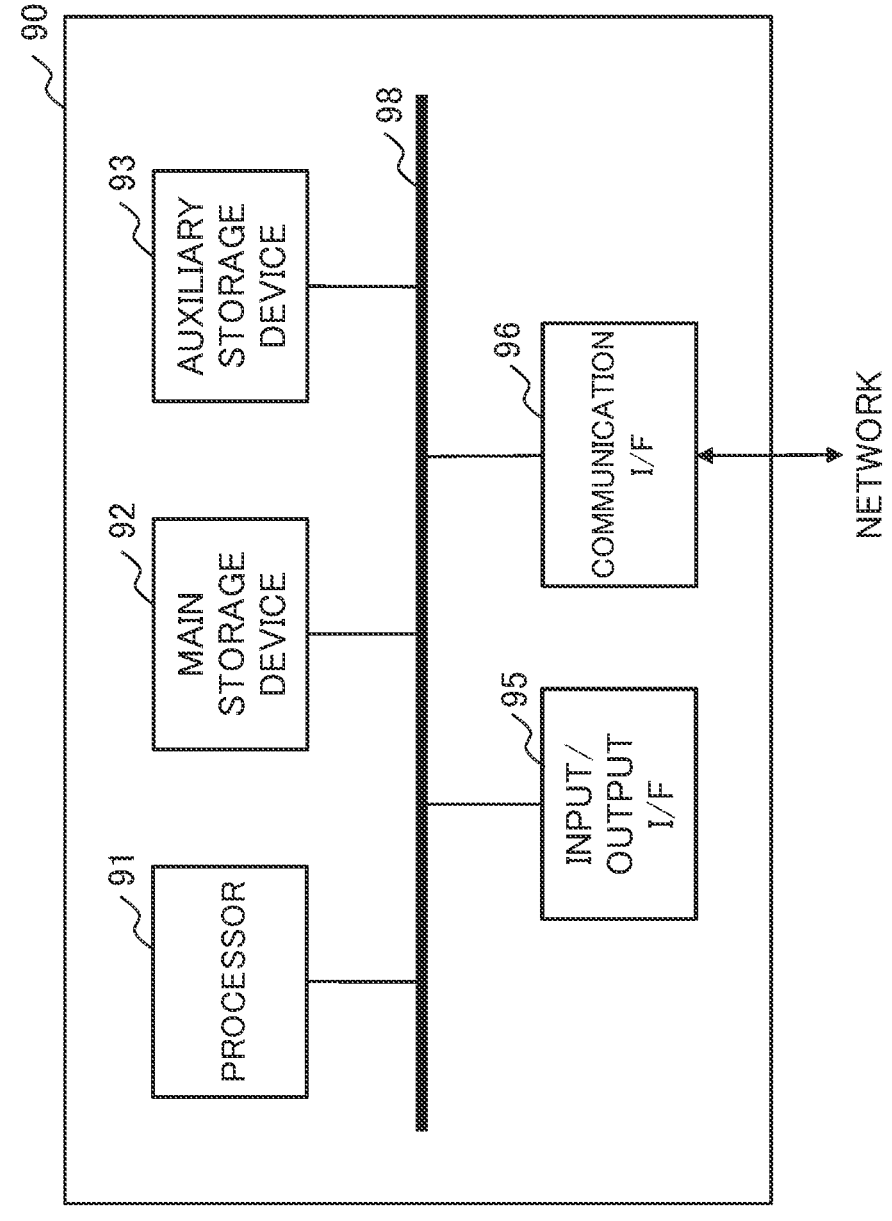
FIG. 28 is a block diagram illustrating an example of a hardware configuration that executes control and processing according to each example embodiment.

As illustrated in FIG. 28, the information processing apparatus 90 includes a processor 91, a main storage device 92, an auxiliary storage device 93, an input/output interface 95, and a communication interface 96. In FIG. 28, the interface is abbreviated as an interface (I/F). The processor 91, the main storage device 92, the auxiliary storage device 93, the input/output interface 95, and the communication interface 96 are connected to each other in a data-communicable manner via a bus 98. The processor 91, the main storage device 92, the auxiliary storage device 93, and the input/output interface 95 are connected to a network such as the Internet or an intranet via the communication interface 96.

The processor 91 develops programs (orders) stored in the auxiliary storage device 93 or the like, in the main storage device 92. For example, the programs are software programs for executing control and processing of each embodiment. The processor 91 executes the programs developed in the main storage device 92. The processor 91 executes the programs to execute control and processing according to each embodiment.

The main storage device 92 has an area in which the programs are to be developed. Programs stored in the auxiliary storage device 93 or the like are developed in the main storage device 92 by the processor 91. The main storage device 92 is implemented by a volatile memory such as a dynamic random access memory (DRAM), for example. A nonvolatile memory such as a magneto resistive random access memory (MRAM) may be configured/added as the main storage device 92.

The auxiliary storage device 93 stores various types of data such as programs. The auxiliary storage device 93 is implemented by a local disk such as a hard disk or a flash memory. The various types of data may be stored in the main storage device 92, and the auxiliary storage device 93 may be omitted.

The input/output interface 95 is an interface for connecting the information processing apparatus 90 and a peripheral device based on a standard or a specification. The communication interface 96 is an interface for connecting to an external system or device through a network such as the Internet or an intranet based on a standard or a specification. The input/output interface 95 and the communication interface 96 may be unified as an interface connected to an external device.

Input devices such as a keyboard, a mouse, and a touch panel may be connected to the information processing apparatus 90 as necessary. These input devices are used to input information and settings. If a touch panel is used as an input device, a screen having a touch panel function serves as an interface. The processor 91 and the input devices are connected via the input/output interface 95.

The information processing apparatus 90 may be provided with a display device for displaying information. If a display device is provided, the information processing apparatus 90 includes a display control device (not illustrated) for controlling display on the display device. The information processing apparatus 90 and the display device are connected via the input/output interface 95.

The information processing apparatus 90 may be provided with a drive device. The drive device mediates reading of data and programs from a recording medium (program recording medium), writing of a processing result of the information processing apparatus 90 to the recording medium, and the like, between the processor 91 and the recording medium. The information processing apparatus 90 and the drive device are connected via the input/output interface 95.

The above is an example of a hardware configuration for enabling control and processing according to each embodiment of the present disclosure. The hardware configuration in FIG. 28 is an example of a hardware configuration for executing control and processing according to each embodiment, and does not limit the scope of the present disclosure. Programs for causing a computer to execute control and processing according to each embodiment are also included in the scope of the present disclosure.

Further, a program recording medium in which the programs according to each example embodiment are recorded is also included in the scope of the present invention. The recording medium can be implemented by an optical recording medium such as a compact disc (CD) or a digital versatile disc (DVD), for example. The recording medium may be implemented by a semiconductor recording medium such as a universal serial bus (USB) memory or a secure digital (SD) card. The recording medium may be implemented by a magnetic recording medium such as a flexible disk, or another recording medium. When a program executed by the processor is recorded in a recording medium, the recording medium corresponds to a program recording medium.

The components of the example embodiments may be arbitrarily combined. The components of the example embodiments may be implemented by software. The components of the example embodiments may be implemented by a circuit.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A communication apparatus comprising:
a transmitter that transmits modulated light modulated by a modulation part of a spatial light modulator as a first spatial light signal;
a receiver that receives a second spatial light signal transmitted from a communication target;
a detector that detects a physical quantity related to oscillation of the own apparatus;
a memory storing instructions; and
a processor connected to the memory and configured to execute the instructions to:
acquire the physical quantity detected by the detector and information on oscillation of the communication target included in the second spatial light signal,
analyze a state of the oscillation of the communication target using the information on the oscillation of the communication target and the physical quantity, and
set a transmission condition of the first spatial light signal in the transmitter according to the analyzed state of the oscillation of the communication target.

2. The communication apparatus according to claim 1, wherein
the processor is configured to execute the instructions to cause the transmitter to transmit the first spatial light signal including data in which the physical quantity detected by the detector is associated with time when the physical quantity was detected.

3. The communication apparatus according to claim 2, wherein
the processor is configured to execute the instructions to set the transmission condition of the first spatial light signal in the transmitter according to a state of relative oscillation of the communication target to the own apparatus.

4. The communication apparatus according to claim 3, wherein
the transmitter includes a light source including a plurality of light emitters that emit illumination light, and
the processor is configured to execute the instructions to set a plurality of modulation regions in the modulation part of the spatial light modulator included in the transmitter in association with the plurality of light emitters included in the light source,
set a phase image in each of the plurality of modulation regions, and
control a transmission direction of the first spatial light signal by controlling a timing with which the illumination light is emitted from the light emitters associated with the plurality of modulation regions.

5. The communication apparatus according to claim 4, wherein the processor is configured to execute the instructions to control the transmitter in such a way that a display state of a pair of dots displayed by the first spatial light signal derived from the illumination light emitted from the plurality of light emitters changes cooperatively according to a predetermined condition, acquire the information on the oscillation of the communication target included in the second spatial light signal transmitted from the communication target in response to reception of the first spatial light signal, and analyze the state of the oscillation of the communication target using the information on the oscillation of the communication target and the physical quantity.

6. The communication apparatus according to claim 4, wherein the processor is configured to execute the instructions to set a composite image obtained by combining a virtual lens image with a phase image in the modulation region, and deform the dots emitted to the communication target by the first spatial light signal in accordance with the state of the oscillation of the communication target.

7. The communication apparatus according to claim 3, wherein the processor is configured to execute the instructions to input the physical quantity detected by the detector and the information on the oscillation of the communication target included in the second spatial light signal to an estimation model that has learned the state of the oscillation of the communication target, analyze the state of the oscillation of the communication target according to an output from the estimation model, and update the estimation model according to the analyzed state of the oscillation of the communication target.

8. A communication system comprising a plurality of the communication apparatuses according to claim 1, wherein the plurality of communication apparatuses is arranged to transmit and receive spatial light signals to and from each other.

9. A communication control method of a communication apparatus including a transmitter configured to transmit modulated light modulated by a modulation part of a spatial light modulator as a first spatial light signal, a receiver configured to receive a second spatial light signal transmitted from a communication target, and a detector configured to detect a physical quantity related to oscillation of the own apparatus, the communication control method comprises:

acquiring, by a computer, the physical quantity detected by the detector and information on oscillation of the communication target included in the second spatial light signal;

analyzing, by the computer, a state of the oscillation of the communication target using the information on the oscillation of the communication target and the physical quantity; and setting, by the computer, a transmission condition of the first spatial light signal in the transmitter according to the analyzed state of the oscillation of the communication target.

10. A non-transitory recording medium recording a program for controlling a communication apparatus including a transmitter configured to transmit modulated light modulated by a modulation part of a spatial light modulator as a first spatial light signal, a receiver configured to receive a second spatial light signal transmitted from a communication target, and a detector configured to detect a physical quantity related to oscillation of the own apparatus, the program causes a computer to execute:

acquiring the physical quantity detected by the detector and information on oscillation of the communication target included in the second spatial light signal;

analyzing a state of the oscillation of the communication target using the information on the oscillation of the communication target and the physical quantity; and setting a transmission condition of the first spatial light signal in the transmitter according to the analyzed state of the oscillation of the communication target.

\* \* \* \* \*